United States Patent [19]
Popper et al.

[11] Patent Number: 5,906,877
[45] Date of Patent: *May 25, 1999

[54] MOISTURE STABLE TUFTSTRING CARPET

[75] Inventors: Peter Popper, Wilmington; Rashi Akki, New Castle; Lap-Tak Andrew Cheng, Newark; Carmen Anoish Covelli, Hockessin, all of Del.; Sassan Hojabr, Kingston, Canada; George Kevork Kodokian, Wilmington, Del.; Vijayendra Kumar, New Castle, Del.; James K. Odle, Newark, Del.; Kalika Ranjan Samant, Hockessin, Del.; Caroline Tjhen Shibata, Newark, Del.; Wae-Hai Tung, Greenville, Del.; Gregory Paul Weeks, Hockessin, Del.; Paul Wesley Yngve, Chapin, S.C.

[73] Assignee: E. I. du Pont de Nemours & Co., Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/611,115

[22] Filed: Mar. 5, 1996

Related U.S. Application Data

[63] Continuation-in-part of application No. 08/513,281, Aug. 10, 1995, abandoned, which is a continuation-in-part of application No. 08/298,642, Aug. 31, 1994, abandoned.

[51] Int. Cl.$^6$ .............................. B32B 3/02; D02G 3/00; D02G 3/36
[52] U.S. Cl. .............................. 428/92; 428/93; 428/96; 428/95; 428/97; 428/377; 428/370; 57/203; 57/210; 57/229
[58] Field of Search ................................ 428/92, 93, 96, 428/95, 97, 370, 377; 57/203, 210, 229

[56] References Cited

U.S. PATENT DOCUMENTS

| | | | |
|---|---|---|---|
| 2,475,019 | 7/1949 | Faris | 428/93 |
| 2,602,765 | 7/1952 | Ahier et al. | 428/92 |
| 2,680,469 | 6/1954 | Ahier et al. | 154/1.1 |
| 2,698,044 | 12/1954 | Runton et al. | 154/1.1 |
| 2,698,045 | 12/1954 | Runton et al. | 154/1.1 |
| 2,738,296 | 3/1956 | Runton et al. | 428/93 |
| 3,034,942 | 5/1962 | Heiks | 428/92 |
| 3,317,366 | 5/1967 | Dionne | 161/66 |
| 3,633,974 | 1/1972 | Lewis, Jr. et al. | 300/21 |
| 3,640,786 | 2/1972 | Carpenter | 156/73 |
| 3,677,851 | 7/1972 | Kayser | 156/73 |
| 3,708,384 | 1/1973 | Carpenter | 161/65 |
| 3,715,878 | 2/1973 | Kim | 57/156 |
| 3,736,209 | 5/1973 | Carpenter | 156/435 |
| 3,856,605 | 12/1974 | Carpenter | 156/436 |

(List continued on next page.)

FOREIGN PATENT DOCUMENTS

| | | | |
|---|---|---|---|
| 4111455 | 4/1992 | Germany | D05C 17/02 |
| 707930 | 11/1970 | South Africa . | |
| WO 96/41913 | 12/1996 | WIPO | D06N 7/00 |

OTHER PUBLICATIONS

Japanese Abstract 5186951 A, Jan. 14, 1991.
Japanese Abstract 5239754 A, Feb. 22, 1992.
Japanese Abstract 5263353 A, Nov. 26, 1991.
Fehrer AG Linz, Austria, Brochure, "The DREF 3 Friction Spinning Machine" (Date Unknown).
Ultrafab, Inc., Farmingtoon, NY, Brochure, "Weatherstripping" (Date unknown).

*Primary Examiner*—Terrel Morris
*Attorney, Agent, or Firm*—George M. Medwick

[57] ABSTRACT

This invention provides moisture stable tuftstring carpet assemblies. The pile surface structure comprises a moisture stable backing substrate, a plurality of elongated pile articles each comprising an elongated, moisture stable support strand having bonded thereto a plurality of "U" shaped bundles of multifilament yarn. The pile articles are bonded to the backing substrate. Different backing substrates and support strands may be used.

22 Claims, 10 Drawing Sheets

U.S. PATENT DOCUMENTS

| | | | |
|---|---|---|---|
| 4,010,302 | 3/1977 | Anderson et al. | 428/95 |
| 4,265,981 | 5/1981 | Campbell | 428/591 |
| 4,291,756 | 9/1981 | Tolbert et al. | 428/373 |
| 4,302,494 | 11/1981 | Horton | 428/95 |
| 4,502,902 | 3/1985 | Zurcher et al. | 156/73.2 |
| 4,584,240 | 4/1986 | Herbert et al. | 428/373 |
| 4,770,915 | 9/1988 | Nakagawa et al. | 428/74 |
| 4,779,410 | 10/1988 | Fehrer | 57/401 |
| 4,871,603 | 10/1989 | Malone | 428/95 |
| 4,923,730 | 5/1990 | Taniguchi et al. | 428/93 |
| 4,927,698 | 5/1990 | Jaco et al. | 428/198 |
| 5,068,142 | 11/1991 | Nose et al. | 428/232 |
| 5,131,914 | 7/1992 | Kelley | 8/449 |
| 5,137,781 | 8/1992 | Lahijani et al. | 428/364 |
| 5,206,085 | 4/1993 | Nakagawa et al. | 428/372 |
| 5,466,497 | 11/1995 | Mosler | 428/92 |
| 5,470,629 | 11/1995 | Mokhtar et al. | 428/92 |
| 5,470,648 | 11/1995 | Pearlman et al. | 428/247 |
| 5,470,656 | 11/1995 | Kennard et al. | 428/370 |
| 5,472,762 | 12/1995 | Edwards et al. | 428/92 |
| 5,498,459 | 3/1996 | Mokhtar et al. | 428/92 |
| 5,506,043 | 4/1996 | Lilani | 428/229 |

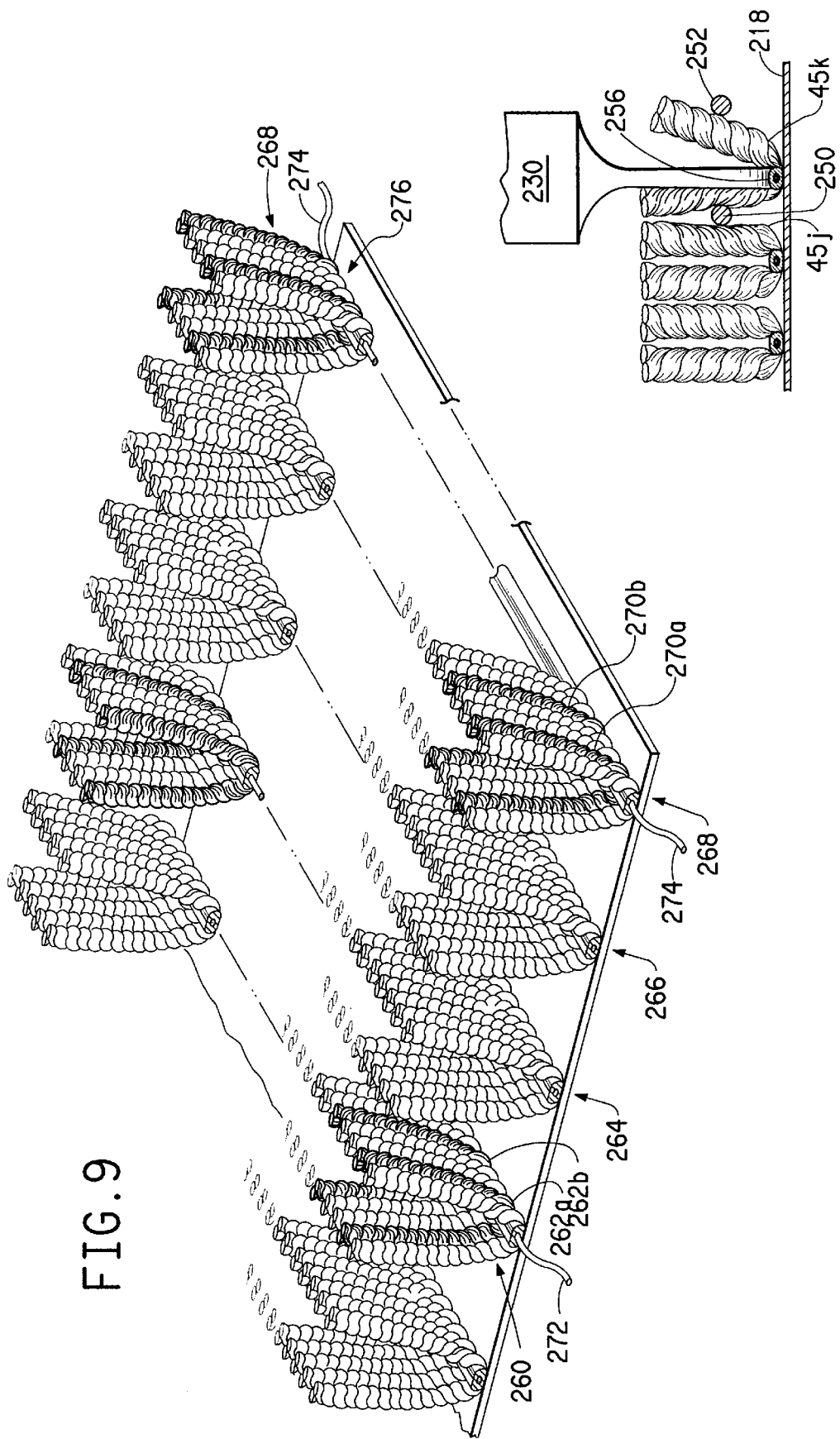

MOISTURE STABLE TUFTSTRING CARPET

CROSS-REFERENCE TO RELATED APPLICATIONS

This application is a continuation-in-part of co-assigned application Ser. No. 08/513,281 filed Aug. 10, 1995 now abandoned, which is a continuation-in-part of application Ser. No. 08/298,642 filed Aug. 31, 1994, now abandoned.

BACKGROUND OF THE INVENTION

Conventional tufted carpets are made by passing a flexible woven primary backing through a tufting machine having a large array of needles that force the carpet multifilament yarn through the backing where the yarn is restrained by a large array of hooks before the needles are retracted. There may be about 1400 needles across a 12-foot width. The backing must accommodate needle penetration without damage. The backing is then advanced a short distance (about 1/10" for a popular high quality tuft density), and the needles are reinserted through the backing to form the next series of yarn tufts. A large array of cutters may be employed in conjunction with the hooks to cut the tuft loop inserted through the backing to produce a cut-pile carpet. For loop-pile carpets, the tuft loops are not cut. Friction holds the tufts in the backing after the needle has moved to the next position.

However, this friction is insufficient to hold the tufts in place during use as a carpet, so an adhesive is applied in liberal quantities to embed all the filaments in the base of the tuft on the underside of the primary backing (needle entry side). This prevents the pullout of tufts or individual filaments during use. To assist in stabilizing, stiffening, strengthening, and protecting the tuft base from abrasion, a secondary backing is attached to the underside of the tufted primary backing. The secondary backing may be attached by the same adhesive layer or by the application of more adhesive. To save on costs, an inexpensive latex adhesive is most often used. The secondary backing must resist damage during shipping, handling and installation.

One problem with the above-described conventional carpets is their heavy structure. As a result, these carpets can be difficult to install and, after a useful life, are difficult to recycle since many different polymers are used in their construction. Nylon tufts, latex adhesive, polypropylene primary backing, and polypropylene secondary backing are commonly used. These materials are difficult to separate for polymer recovery; latex and nylon polymers are not compatible for recycle. This has resulted in millions of pounds of waste carpet being dumped in landfills each year.

Predominantly nylon ("all-nylon") carpets have been suggested in the past. However, nylon polymer useful for backings in such carpets have a moisture sensitivity that causes as much as 4% to 10% changes in the dimensions of the carpet in response to changes in the humidity from very moist to very dry depending somewhat on the temperature. These problems of moisture and thermal stability have not been adequately addressed in the past, so a carpet with a backing structure that would constantly lay flat in use was not possible. Moisture changes common in residential use can result in large buckles in carpets where the carpet is restrained in movement by contact with walls (in wall-to-wall installations), or frictionally held by heavy furniture or spaced attachment to floors. In particular, moisture variations from near 0% RH to near 100% RH at elevated household temperatures are a concern to the stability of carpets in residential use.

Lightweight carpet constructions have been suggested, but they have relied on the bulk application of adhesives that are messy to handle in the manufacturing process and are difficult to recycle with the nylon polymer commonly used for the yarn tufts. The machines suggested for such lightweight construction were cumbersome to set up and operate as they handled an entire carpet width of materials in a continuous coupled process. They also usually required discrete yarn supplies to feed the process and so required expensive yarn restocking at intervals or frequent stoppages to replace individual bobbins as they randomly ran out.

There is a need for a carpet construction that is lightweight, dimensionally stable in use, and can be recycled easily to produce useful polymers. There is a need for an "all-nylon" carpet that is stable to moisture and temperature changes in use. There is a need for a simple inexpensive method of making such carpets. The present invention provides such carpets.

SUMMARY OF THE INVENTION

The pile surface structures (i.e., "tuftstring carpet assembly" or "carpet") of this invention are improvements over the carpet constructions suggested in co-assigned U.S. Pat. No. 5,472,762, the disclosure of which is hereby incorporated by reference.

The present invention is a lightweight, moisture stable tuftstring carpet assembly made by bonding a plurality of upright tufts of yarn to an elongated, moisture stable support strand to make an elongated pile article; and bonding a plurality of said pile articles side-by-side to a lightweight, moisture stable backing substrate. A variety of material combinations for the tufts, support strand, and backing substrate can be used to achieve the lightweight structure and moisture stability desired in the carpet. In the majority of moisture stable tuftstring carpet assemblies of this invention, the assembly comprises a moisture stable backing substrate which is moisture stable in the machine direction (MD) and cross-machine direction (XD) and a plurality of elongated pile articles. Each pile article comprises an elongated, moisture stable support strand having bonded thereto a plurality of "U" shaped bundles of multifilament yarn, wherein each bundle defines a pair of upstanding tufts extending from the strand. The elongated pile articles are placed one next to the other and bonded to the backing substrate with the tufts extending away from the backing.

In one embodiment, nylon 6,12 monofilament is used as the elongated, moisture stable support strand. In other embodiments, the support strand comprises a core of continuous glass filaments and at least one multifilament yarn at least partially wrapped around the core. Preferably, the multifilament yarn which is at least partially wrapped around the core is either a staple yarn or a bulked continuous filament yarn. More preferably, the multifilament yarn is a nylon staple yarn. The nylon staple yarn may comprise a blend of nylon and polypropylene filaments or filaments formed from a nylon copolymer comprising units of nylon 6,6 and units derived from 2-methyl-pentamethylenediamine. In still other embodiments, the support strand may comprise a core of continuous glass filaments and a sheath comprising a nylon copolymer containing units of nylon 6 and nylon 6,6 or a nylon copolymer containing units of nylon 6,6 and units derived from 2-methylpentamethylenediamine surrounding the core.

The moisture stable backing substrate may comprise a first layer of a nonwoven fabric of entangled, nonbonded nylon filaments, a second layer of fiberglass scrim, and a third layer of a nonwoven fabric of entangled, nonbonded nylon filaments, wherein each layer of nonwoven fabric is adhesively bonded to the layer of fiberglass scrim at contact points along the fabrics and scrim. The nylon comprising the filaments of the first and second layers may be a nylon 6,6 copolymer containing units derived from 2-methylpentamethylenediamine. In other embodiments, the backing substrate may comprise a nonintersecting array of moisture stable strands spaced apart at a density of less than or equal to 10 strands/inch. These moisture stable strands are oriented in a cross direction from 45 to 90 degrees to the elongated pile articles. Each of these moisture stable strands of the backing may comprise a core of continuous glass filaments and at least one multifilament nylon yarn at least partially wrapped around the core. In such instances, the moisture stable support strands of the elongated pile articles may also comprise a core of continuous glass filaments and at least one multifilament nylon yarn at least partially wrapped around said core. In other instances, the moisture stable strand of the backing may comprise a core of continuous glass filaments and a nylon sheath surrounding the core. In other embodiments, the array of nonintersecting moisture stable strands comprising the backing substrate are attached to a backing support fabric. Examples of suitable backing support fabrics include a spunbonded polyester fabric, a nonbonded, nonwoven polyester fabric, and a spunbonded fabric comprising bicomponent filaments of a polyester core and a nylon sheath.

In other embodiments, the pile surface structure comprises a backing substrate which is at least moisture stable in the cross-machine direction (XD) having an inner surface and an outer surface and a plurality of elongated pile articles each comprising an elongated, moisture stable support strand. A plurality of "U" shaped bundles of multifilament nylon yarn are bonded to the strand, each bundle defining a pair of upstanding tufts extending from the strand. The inner surface of the backing substrate is coated with a polyethylene film having a melting point of greater than 100° C. and less than the melting point of the multifilament nylon yarn. The elongated pile articles are placed one next to the other and bonded to the inner surface of the backing substrate with the tufts extending away from the backing. Preferably, the polyethylene film comprises a blend of polyethylene polymer and a polyethylene copolymer grafted with maleic anhydride. The polyethylene film preferably has a melting point greater than 100° C. and a melt index in the range of 0.5 to 30 dg/min at 190° C. Preferably, the polyethylene film has a thickness in the range of about 3 mil to 5 mil. In one embodiment of this pile surface structure, the elongated pile articles are ultrasonically bonded to the backing substrate and the pile surface structure is heated to a temperature in the range of about 125° to 180° C.

In other moisture stable tuftstring structures of this invention, the structure comprises a moisture stable backing substrate which is moisture stable in the machine direction (MD) and cross-machine direction (XD), and a plurality of elongated pile articles each comprising an elongated, moisture stable support strand having bonded thereto a plurality of "U" shaped bundles of multifilament yarn, wherein each bundle defines a pair of upstanding tufts and the support strand has a melting point which is lower than the melting point of the multifilament yarn. The backing substrate may also have a melting point which is lower than the melting point of the multifilament yarn.

BRIEF DESCRIPTION OF THE FIGURES

FIG. 8 is a close up view of the elongated pile articles and the ultrasonic horn.

FIG. 9 is a diagrammatic view of a plurality of tuftstrings showing variations in the tufts and strands.

DETAILED DESCRIPTION OF THE INVENTION

The present invention provides a "moisture-stable tuftstring carpet assembly". By the term "moisture-stable tuftstring carpet assembly" or "moisture stable carpet", it is meant a tuftstring carpet assembly (pile surface structure) which may be manufactured by the methods described below, wherein the length dimension of the assembly in both the tuftstring direction (T/SD) i.e., the machine direction (MD), and the cross-tuftstring direction (XD) changes 2% or less in response to a change in the humidity from 100% to 3% or less at a temperature of 40° C. Preferably, the change in length in both the T/SD and XD is 1% or less especially when the carpet assembly is intended for use in a large area and is to be secured to the floor only at spaced locations or only around the edges. The moisture stability of the tuftstring carpet assembly and its individual components, i.e., support strand and backing substrate as described further below, is measured per the tests described in the Test Methods below.

By the term "moisture sensitive tuftstring carpet assembly", it is meant a tuftstring carpet assembly, wherein the length dimension of the assembly in the tuftstring direction (T/SD) and/or the cross-tuftstring direction (XD) changes greater than 2% in response to a change in the humidity from 100% to 3% or less at a temperature of 40° C.

Figure 1:
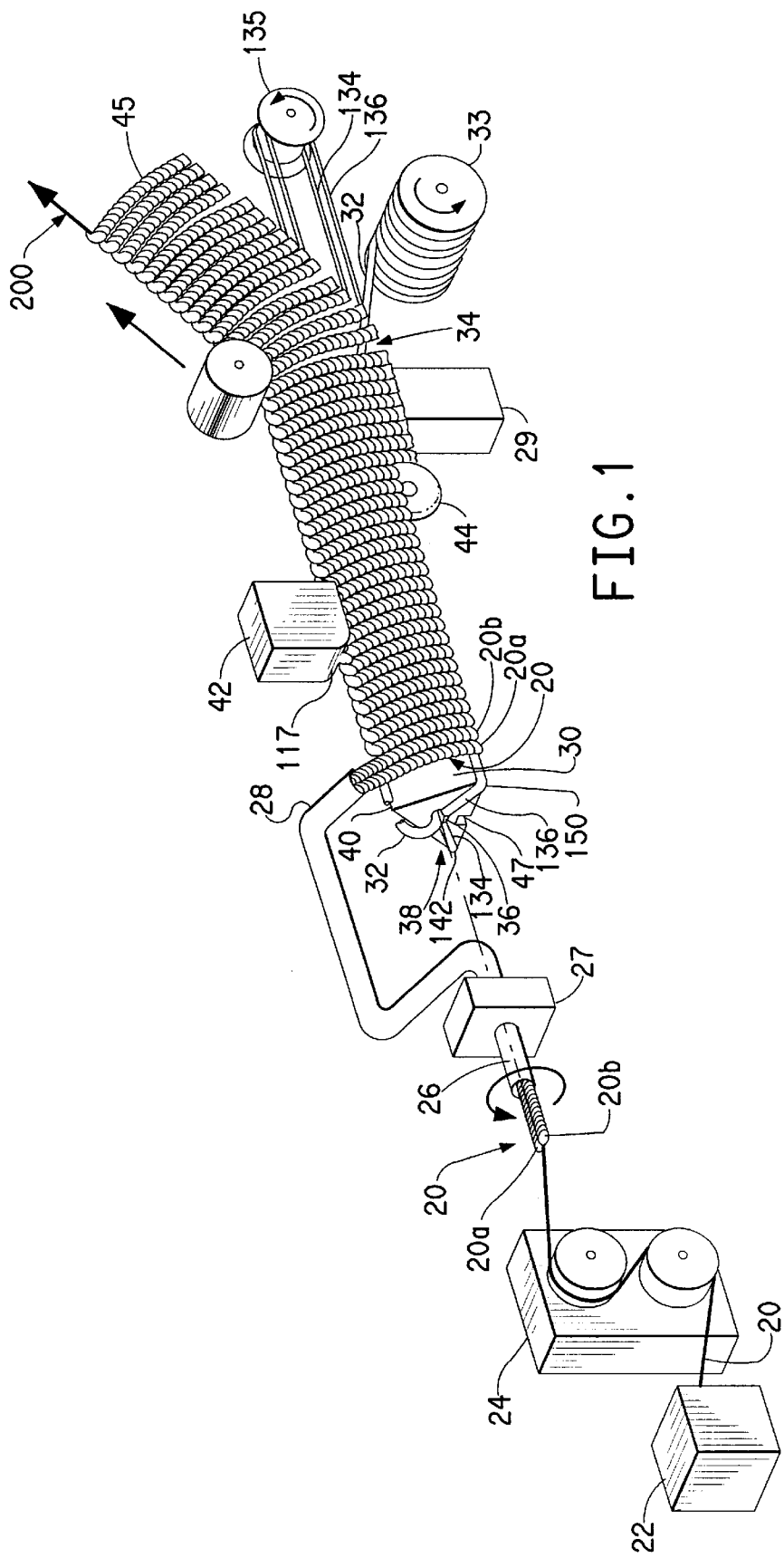
FIG. 1 is a diagrammatic view of one process for making an elongate pile article.

FIG. 1 shows an apparatus and method of making a single elongated pile article, or "tuftstring" by attaching plied carpet yarn 20 to a reinforced support strand 32. The strand 32 is guided along the edge 40 of a mandrel 30 and the plied yarn 20 is wrapped around the mandrel and strand by rotating eccentric guide 26. One or multiple strands may be wrapped at once; two are shown at 20*a* and 20*b*. The yarn 20 is ultrasonically bonded to the strand 32 as it is pulled under ultrasonic horn 42 by movement of strand 32 and other carriers 134 and 136. The wrapped yarn 20 is cut by rotating blade 44 that intersects mandrel slot 47 so the strand with bonded yarn attached can be removed from mandrel 30 and guided to further processing steps as at 200. The above-described process and the tuftstring product produced is discussed further in U.S. Pat. No. 5,472,762.

Figure 3:
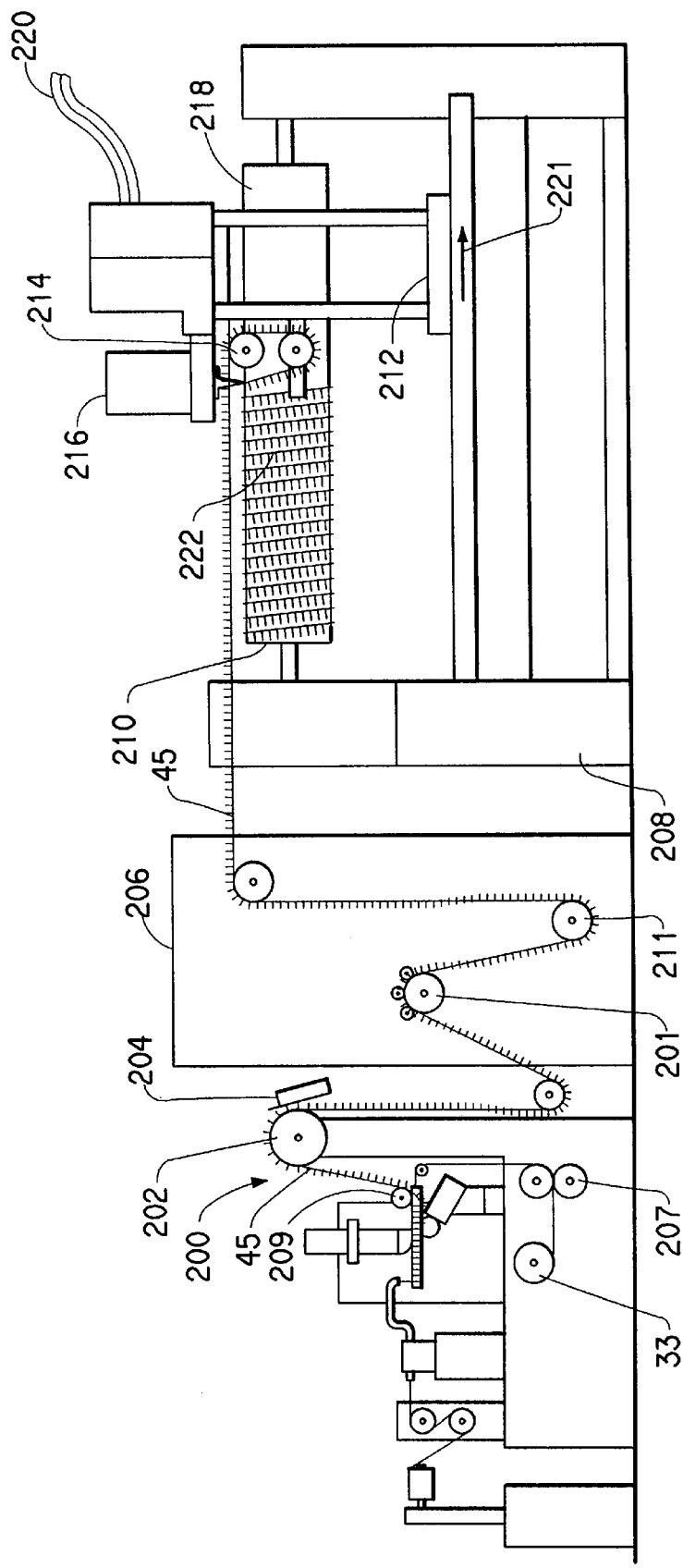
FIG. 3 is a diagrammatic view of one process for making a pile surface structure (tuftstring carpet assembly) using elongated pile articles.

FIG. 3 shows an apparatus for carrying out further processing steps on the tuftstring. The apparatus of FIG. 1 is shown in the left of FIG. 3 and the further processing steps are shown beginning at position 200. The single tuftstring 45 passes over a slotted driven roll 202 where the tuftstring may have the pile height trimmed to a desired height by electric shears 204, and then proceeds to a forwarding and tensioning assembly 206. The tuftstring 45 proceeds to a lathe type device 208 on which is mounted a large cylinder 210 for winding the tuftstring onto a backing fabric in a spiral array. Mounted for travel along the guideways of the lathe device 208 is a carriage 212 that includes tensioning and guiding devices 214 and ultrasonic bonding devices 216 for attaching the tuftstring to a backing 218 held on the cylinder 210. Flexible lines shown at 220 are for directing electrical power, control signals, and compressed air to and from the moving carriage 212.

In FIG. 3, after the tuftstring 45 has been traversed the length of the cylinder 210 (from left to right in FIG. 3 in the direction of arrow 221) and bonded along the length of the tuftstring to the backing 218, a pile surface structure (tuftstring carpet assembly), 222 is produced on the cylinder. By slitting the structure along the axis of the cylinder, the structure can be removed from the cylinder and laid flat like a conventional carpet. The carpet may be subject to additional treatments, such as dyeing and bulking, after removal from the cylinder, or some treatments may be accomplished before removal from the cylinder. For instance, it is possible to place a housing around a portion of the cylinder surrounding a section of bonded carpet and supply a heated fluid to the housing to bulk the carpet on-line.

The reinforced support strand 32 is preferably a multifilament bundle of fiberglass coated with nylon which provides a moisture-stable, structural, adhesive strand as described in U.S. Pat. No. 5,470,656, the disclosure of which is hereby incorporated by reference. By the term, "moisture stable support strand" it is meant a strand, wherein the length dimension of the strand changes 2% or less in response to a change in the humidity from 100% to 3% or less at a temperature of 40° C. Preferably, the change in length is 1% or less, especially when the strand is to be used for large area carpets which are secured to the floor.

Figure 2:
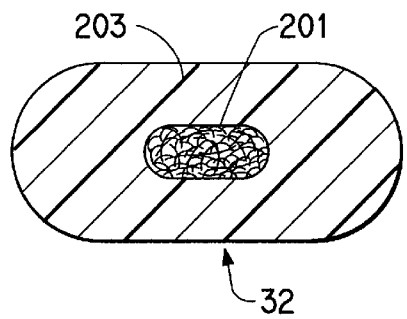
FIG. 2 is a cross-sectional view of a support strand.

ReferrIng to FIG. 2, the strand 32 preferably comprises a core 201 of continuous glass reinforcing filaments and a nylon sheath 203 surrounding the core. The nylon sheath is preferably adhered to the periphery of the core and the strand preferably has a cross-sectional area ratio of glass to nylon of 0.10 to 0.30.

The reinforcing filaments (e.g., glass) of the strand are substantially insensitive to moisture (i.e., the filament's length is substantially unchanged due to changes in humidity) and the filaments have less than 0.20% water pick-up. The reinforcing filaments should have a modulus per unit density of at least five times that of the thermoplastic resin (e.g., nylon) used for the sheath. Preferably, the reinforcing filaments are multifilaments of glass, ceramic fiber or carbon fiber. The carbon fibers may be pitch-derived carbon fibers obtained from petroleum or coal tar pitch, or PAN-type carbon fibers obtained from acrylic fibers. The glass may be continuous strand-type or staple-type. Continuous-type glass is preferred. The ceramic fibers may be SiC fibers, SiN fibers, BN fibers or alumina fibers. Organic polymeric filaments having the required moisture stability and modulus/density may also be used. It is also recognized that monofilaments may be used.

The thermoplastic resin which can be used as a sheath for the strand may be a polymer resin which is considered substantially insensitive to moisture such as polyethylene terephthalate (PET), preferably "Dacron" PET, polypropylene, or the like. Alternatively, the polymer resin for the strand may be considered substantially sensitive to moisture such as a polyimide or a polyamide. Suitable polyamides include, for example, nylon 6,6; nylon 6; and copolymers and blends thereof. For example, a copolymer containing units of nylon 6,6 and nylon 6 or a copolymer containing units of nylon 6,6 and units derived from 2-methyl-pentamethylenediamine may be used. Recycled consumer or industrial waste versions of these resins also work, and may make the product easier to process and less expensive.

In other embodiments, it is not necessary for the strand to have a sheath/core structure. For example, a strand comprising a nylon, polypropylene, or polyester monofilament or multifilaments could be used as illustrated below in Table I. A nylon 6,12 monofilament support strand is described below in Example 5. In other instances, the moisture stable support strand may comprise a core of continuous glass filaments and at least one multifilament yarn at least partially wrapped around the core. Preferably, the multifilament yarn is either a staple yarn or a bulked continuous filament yarn. More preferably, the multifilament yarn is a nylon staple yarn. The nylon filaments may be formed from a nylon 6,6 copolymer containing units derived from 2-methylpentamethylenediamine. Other nylons may also be used to form the nylon filaments such as nylon 6,6; nylon 6; and nylon 6,12 and copolymers and blends thereof. In some embodiments, the nylon staple yarn may comprise a blend of nylon and polypropylene filaments.

Alternatively, the strand may be a moisture sensitive structure. By the term, "moisture sensitive support strand" it is meant a strand, wherein the length dimension of the strand changes greater than 2% in response to a change in humidity from 100% to 3% or less at a temperature of 40° C.

The multifilament yarns which are used as the tuft yarns may be manufactured by various methods known in the art. These yarns contain filaments (fibers) prepared from synthetic thermoplastic polymers such as polyamides, polyesters, polyolefins, and acrylonitriles, and copolymers or blends thereof. Natural fibers such as wool may also be used. Preferably the polyamide (nylon) is selected from the group consisting of nylon 6,6 or nylon 6 homopolymer or copolymers thereof, sulfonated nylon 6,6 or nylon 6 copolymer containing units derived from an aromatic sulfonate or an alkali metal salt thereof, nylon 6,6 or nylon 6 copolymer containing units derived from 2-methyl-pentamethylenediamine (MPMD) and isophthalic acid, nylon 6,6 copolymer containing units derived from isophthalic acid and terephthalic acid, and nylon 6,6 copolymer containing units derived from N,N'-dibutylhexamethylenediamine and dodecanedioic acid. One preferred nylon 6,6 copolymer contains about 1.0 to about 4.0 weight percent of units derived from the sodium salt of 5-sulfoisophthalic acid.

Preferably, the polyolefin is polypropylene homopolymer or copolymers or blends thereof such as the propylene/ethylene copolymer described in co-pending, co-assigned U.S. patent application Ser. No. 08/419,569 filed Apr. 10, 1995, the disclosure of which is hereby incorporated by reference.

Preferably the polyester is selected from the group consisting of poly(ethylene terephthalate), poly(trimethylene terephthalate), and poly(butylene terephthalate) and copolymers and blends thereof. Poly(trimethylene terephthalate) is especially preferred because it can be used to make fibers having unique carpet texture retention and wear-resistance properties as described in co-pending, co-assigned U.S. patent application Ser. No. 08/268,585 filed Jun. 30, 1994, the disclosure of which is hereby incorporated by reference.

These polymers are used to prepare polymer melts or solutions which are extruded through spinnerets to form filaments by techniques known in the art such as those described in the above-referenced applications. The polymer melt or solution may contain additives such as UV stabilizers, deodorants, flame retardants, delustering agents, antimicrobial agents, and the like.

In some instances, the multifilament yarns containing these filaments are subsequently dyed to form colored tuft yarns. These yarns may be referred to as pre-dyed yarns since they are colored prior to manufacturing the carpet.

In other instances, a method known as solution-dyeing may be used to make colored filaments which are then used to make the multifilament colored tuft yarns. Generally, a solution-dyeing method involves incorporating pigments or dyes into the polymer melt or solution prior to extruding the blend through the spinneret. In a carpet context, these may also be referred to as pre-dyed yarns since the color is put in the yarn before the carpet is tufted or otherwise formed.

The pigment may be added in neat foam, as a mixture with the above additives, or as a concentrate wherein the pigment is dispersed in a polymer matrix. For color concentrates, one or more pigments are dispersed in a polymer matrix which also contains such additives as lubricants and delustering agents ($TiO_2$). The color concentrate is then blended with the filament-forming polymer and the blend is spun into colored filaments. For example, U.S. Pat. No. 5,108,684, the disclosure of which is hereby incorporated by reference, involves a process where pigments are dispersed in a terpolymer of nylon 6/6,6/6,10 and pigmented pellets of the terpolymer are formed. These pellets are then remelted or "let-down" in an equal or greater amount of nylon 6, mixed thoroughly to form a uniform dispersion, resolidified, and pelletized. The resulting color concentrate is then blended with a nylon copolymer containing an aromatic sulfonate or an alkali metal salt thereof. The nylon melt-blend is then spun to form stain-resistant, colored nylon filaments.

Typically in a nylon filament manufacturing process, the molten polymer is extruded through the spinneret into a quench chimney where chilled air is blown against the newly formed hot filaments. The filament's cross-sectional shape is dependent upon the design of the spinneret. Preferably, the filament has a trilobal cross-section with a modification ratio (MR) of about 1.0 to about 4.0. The cross-section of the filaments influences the luster (glow of the filaments from reflected light), soil-hiding, bulk, and hand properties of the tuft yarns. The filament may contain voids extending through its axial core, as described in U.S. Pat. No. 3,745,061 or U.S. Pat. No. 5,230,957. The presence of voids in the filaments influences the luster and soil-hiding properties of the tuft yarns.

The filaments are pulled through the quench zone by means of feed rolls and treated with a spin-draw finish from a finish applicator. The filaments are then passed over heated draw rolls. Subsequently, the filaments may be crimped to make bulked continuous filament (BCF) yarns. These yarns have randomly spaced 3-dimensional curvilinear crimp. Alternatively, the filaments may be crimped and cut into short lengths to make staple fiber. Hot air jet-bulking methods, as described in U.S. Pat. No. 3,186,155 or U.S. Pat. No. 3,525,134, may be employed to crimp and bulk the yarn. Generally, for purposes of this invention, each yarn has a bulk crimp elongation (BCE) of about 20% to 50%, and a denier per filament (dpf) of about 16 to 25. For entangled filament, loop-pile tuftstring carpets with good bulk, the BCE % may be toward the higher end of the above-mentioned BCE % range. For ply-twisted, cut-pile tuftstring carpets with good hand, the BCE % should be in a range of 27% to 49%, preferably 31% to 43%. For velour, cut-pile carpets with good resistance to felting, the BCE % may be toward the lower end of the above-mentioned BCE % range.

If the yarns are intended for use in a cut-pile tuftstring carpet structure, then these "singles" component yarns may then be twisted together to form a ply-twisted multifilament yarn. This ply-twisted multifilament yarn is constructed by cabling together two or more component yarns by such techniques as, for example, a two-step twisting/cabling process or a direct cabling process, as described in U.S. Pat. No. 5,263,308. The ply-twist may be unidirectional or the twist may have alternate directions as described in U.S. Pat. No. 4,873,821. For purposes of this invention it is preferable that the total denier of the ply-twisted yarn be at least 2000 and more preferably in the range of about 2400 to about 3100. The ply-twisted yarn is preferably a two-ply yarn with a twist level in the range of about 3 to about 5 turns per inch (tpi). Alternatively, the yarns may be false-twisted or air-entangled depending on the desired carpet construction.

If a ply-twisted multifilament yarn is constructed, it may then be "textured" by passing the yarn through a stuffer box, where the yarn is compressed and individual filaments are folded and bent. The yarn may also be heat-treated to set the twist in the yarn. This heat-setting of the twist is done if the yarn is intended for use in a cut-pile carpet structure. These techniques are also well known in the art. For example, the yarn may pass through a "Superba" continuous heat-setting machine which treats the yarn with pressurized saturated steam or a "Suessen" machine which treats the yarn with dry heat. If the yarn is a solution dyed nylon yarn, treating it on the "Suessen" machine will impart stain resist and bleach resist properties not acquired by treating the yarn on the "Superba" machine. These yarns may then be used to construct the tuftstring carpet assembly in accordance with the methods described herein.

In the final carpet assembly, the tufts may have various forms such as, for example, loop-pile or cut-pile. Loop-pile tufts are characterized by having the yarn in the form of an uncut loop as described in U.S. Pat. No. 5,470,629, the disclosure of which is hereby incorporated by reference. Cut-pile tufts may be obtained by cutting the loops of the tuft yarns or preferably by the process shown in FIG. 1.

The final tuftstring carpet assembly may also treated with stain-resist agents which provide resistance to staining of the pile yarn by acid dyes. These stain-resist agents include, for example, sulfonated phenol- or naphthol-formaldehyde condensate products and hydrolyzed vinyl aromatic maleic anhydride polymers as described in U.S. Pat. No. 4,925,707. The tuftstring carpet assembly may also be treated with soil-resist agents which provide resistance to soiling of the pile yarn. These soil-resist agents include, for example, fluorochemical compositions as described in U.S. Pat. No. 5,153,046.

Preferably, the tuft yarn contains filaments made from a polymer that can be fusion bonded to the selected polymer of the strand by thermal fusion or solvent fusion or the like, whereby the original polymer used for the strand and tuft provide the means for joining the strand and tuft, and the addition of a separate adhesive material is not required. However, the addition of a small quantity of adhesive material to enhance fusion bonding may be desirable. Preferably, the tuft polymer and the strand polymer are the same polymer or of the same polymer family.

The backing substrate 218 must be "moisture stable" in the direction perpendicular to the tuftstring, i.e, the cross-machine direction (XD), and it may or may not be moisture stable in the tuftstring direction (T/SD), i.e., the machine direction (MD). By the term "moisture stable", it is meant that the length dimension of the respective direction, (XD) or (MD) changes 2% or less in response to a change in the humidity from 100% to 3% or less at a temperature of 40° C.

The "backing substrate" may be any suitable sheet-like material including, for example, fabrics such as felts, wovens, non-wovens, knits, and flocs, and films such as slit film wovens.

The backing substrate may also be an array of moisture stable strands oriented in a cross-direction from 45 to 90 degrees to the direction of the tuftstrings. The moisture stable strands are spaced apart at a density of less than or equal to 10 strands/inch. In one embodiment, these moisture stable strands may comprise a core of continuous glass filaments and at least one multifilament nylon yarn at least partially wrapped around the core. The nylon yarn may be a bulked continuous filament yarn or a staple yarn. Alternatively, the moisture stable strand of the backing may comprise a core of continuous glass filaments and a nylon sheath surrounding the core. Parallel strands may be held together in the array with a leno weave of a connecting yarn, or the array may be attached to a backing support fabric using, for example, an adhesive applied to each strand. Different backing support fabrics may be used including, for example, a spunbonded polyester fabric, a nonbonded non-woven polyester fabric, and a spunbonded fabric comprising bicomponent filaments of a polyester core and a nylon sheath.

By the term "moisture stable backing substrate", it is meant a backing substrate, wherein the length dimension of the substrate in both the machine direction (MD) and the cross-machine direction (XD) changes 2% or less in response to a change in the humidity from 100% to 3% or less at a temperature of 40° C. Preferably, the change in length in both the MD and XD is 1% or less especially when the substrate is to be used for large area carpets which are secured to the floor. The thermoplastic polymer suitable for making a moisture stable backing substrate may be a polymer which is substantially insensitive to moisture such as polyethylene terephthalate (PET), preferably "Dacron" PET, polypropylene, or the like.

Alternatively, the polymer of the backing may be substantially sensitive to moisture and be stabilized in at least the XD with reinforcing filaments that are substantially insensitive to moisture. This would result in what is referred to as a "moisture sensitive backing substrate", by which it is meant a backing substrate, wherein the length dimension of the backing in the machine direction (MD) changes greater than 2% in response to a change in the humidity from 100% to 3% or less at a temperature of 40° C. Some moisture sensitive polymers useful for making such a backing substrate include polyimides or polyamides. Suitable polyamides include, for example, nylon 6,6; nylon 6; and copolymers and blends thereof. For example, a nylon 6,6 copolymer containing units derived from 2-methyl-pentamethylenediamine may be used. Recycled consumer or industrial waste versions of these resins also work, and may make the product easier to process and less expensive.

To achieve the required moisture stability and structural stability in the finished carpet structure, the backing substrate may be reinforced with reinforcing filaments or a reinforcing scrim. The reinforcing filaments of the backing are substantially insensitive to moisture (i.e. the filament's length is substantially unchanged due to changes in humidity) and the filaments have less than 0.20% water pick-up. The reinforcing filaments should have a modulus per unit density of at least five times that of the thermoplastic polymer used to make the backing. Preferably, the reinforcing filaments are multifilaments of glass, ceramic fiber or carbon fiber. The carbon fibers may be pitch-derived carbon fibers obtained from petroleum or coal tar pitch, or PAN-type carbon fibers obtained from acrylic fibers. The glass may be continuous strand-type or staple-type. Continuous-type glass is preferred. The ceramic fibers may be SiC fibers, SiN fibers, BN fibers or alumina fibers. Organic polymeric filaments having the required moisture stability and modulus/density may also be used.

Figure 4:
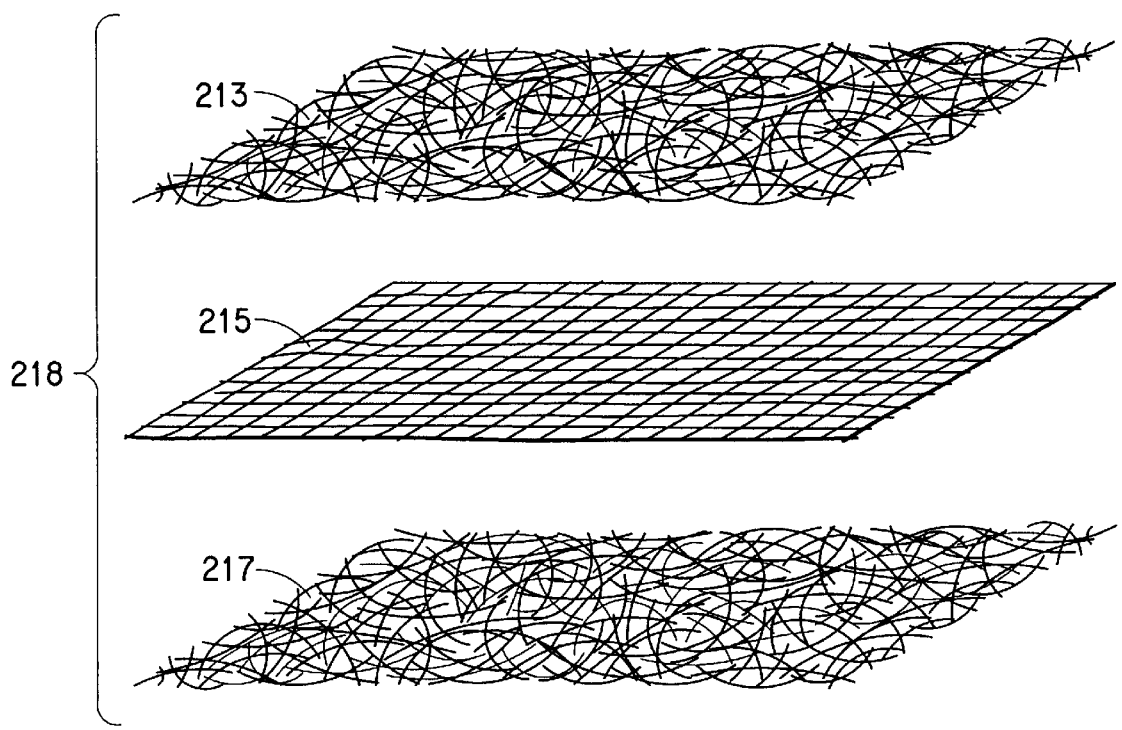
FIG. 4 is an exploded view of a backing fabric.

The backing substrate 218 is preferably a composite fabric of nonwoven nylon and fiberglass scrim as described in U.S. Pat. No. 5,470,648, the disclosure of which is hereby incorporated herein by reference. Preferably, the composite fabric is a moisture stable backing substrate. Referring to the exploded view in FIG. 4, the moisture stable backing substrate 218 preferably comprises a first layer 213 of a non-woven fabric of entangled, non-bonded nylon filaments, a second layer 215 of fiberglass scrim, and a third layer 217 of a nonwoven fabric of entangled, non-bonded nylon filaments. Each layer of nonwoven nylon fabric is adhesively attached to the layer of fiberglass scrim predominantly at the contact surface between the fabrics and scrim so most of the non-bonded nylon filaments remain non-bonded. Preferably the adhesive is an acrylic adhesive.

As described above, different backing substrates may be used for the tuftstring carpet assemblies of this invention. In one embodiment, the inner surface of the backing substrate may be coated with a polyethylene or polypropylene adhesive film in order to improve the adhesion between the tuftstrings and the backing substrate. The film has a melting point greater than 100° C. and less than the melting point of the multifilament nylon pile yarn. The film may be made by extruding a resin through a slot die onto a chilled roll. The resin solidifies to form a free-standing film which may be wound onto a core and stored for future use. Alternatively, the resin may be extruded directly onto the backing substrate to form the film. It is preferable that the thickness of the film on the backing substrate be in the range of about 3 mil to 5 mil.

The polyethylene or polypropylene composition comprising the resin may be formed from a copolymer of ethylene or a copolymer of propylene with at least one of a C3-C10 hydrocarbon alpha-olefin, vinyl acetate, alkyl acrylate, or alkyl methacrylate that has been grafted with a monomer selected from ethylenically unsaturated dicarboxylic acids and anhydrides thereof. Examples of the hydrocarbon alpha-olefins include butene-1, hexene-1 and octene-1. Examples of the alkyl groups of the meth(acrylates) include methyl, ethyl, propyl and butyl. The grafting monomer is at least one monomer selected from ethyleneically unsaturated carboxylic acids and ethylenically unsaturated carboxylic acid anhydrides. Examples of the acids and anhydrides are acrylic acid, methacrylic acid, maleic acid, fumaric acid, itaconic acid, crotonic acid, itaconic anhydride, methyl nadic anhydride, maleic anhydride, and substituted maleic anhydride. It is preferable that the grafted maleic anhydride polymer composition be used for purposes of this invention. Commercially available examples of such ethylene copolymers and propylene copolymers include "Fusabond" adhesive resins available from DuPont Canada, Inc. and are described in GB Patent Specification 2,284,152, the disclosure of which is hereby incorporated by reference. It is preferable that compositions of ethylene copolymer grafted with maleic anhydride be used for purposes of this invention.

To form the adhesive resin, these grafted polymer compositions may be used by themselves in concentrate form or they may be blended with non-grafted polymers. Particularly, these grafted polymer compositions may be blended with non-grafted polymers such as medium density polyethylene (MDPE), low density polyethylene (LDPE), linear low density polyethylene (LLDPE), very low density polyethylene (VLDPE), and polypropylene and blends thereof to modify such properties as the melting point, viscosity, and maleic anhydride content of the resin. Commercially available examples of such ethylene copolymer blends and propylene copolymer blends include "Bynel" adhesive resins available from DuPont (Wilmington, Del.). It is preferable that ethylene copolymer blends be used for purposes of this invention.

If the grafted polymer composition is used by itself in concentrate form as the adhesive resin, then the resin should have a melting point greater than about 100° C. and in the range of about 100 to 130° C. for polyethylene-based compositions and about 130 to 170° C. for polypropylene-based compositions or ethylene/propylene-based compositions. In addition, the melt index of such a concentrate resin should be in the range of about 0.5 to 30 dg/minute at 190° C. and the maleic anhydride content of the resin should be in the range of about 0.01 to 5.00% by weight of resin. These melting point and melt index ranges provide a film having good stability in the carpet structure. The carpet may be subsequently bulked and the finished carpet may be steam cleaned without backing delamination problems.

If the grafted polymer composition is blended with a non-grafted polymer such as those described above, (MDPE), (LDPE), (LLDPE), (VLDPE), or polypropylene, or blends thereof to form the resin, then the blended resin should have a melting point greater than about 100° C. and in the range of about 100 to 130° C. for polyethylene-based compositions and 130 to 170° C. for polypropylene-based compositions or ethylene/propylene-based compositions. In addition, the melt index of such a blended resin should be in the range of about 0.5 to 30 dg/minute at 190° C. and the maleic anhydride content of the resin should be in the range of about 0.05 to 1.00% by weight of resin.

It is also believed that the adhesive resins may be formed from unmodified polyethylene polymer or polyethylene polymer or copolymers and blends thereof provided that the resin has a melting point greater than 100° C. and less than the melting point of the nylon pile yarn. If the backing substrate is coated with a polyethylene film then the tuftstrings may be ultrasonically bonded to the backing substrate and the tuftstring carpet may be bulked at a temperature of 125° C. to 180° C. in a bulking method as described below.

When the above preferred backing is a thin backing of 1 oz/sq yd "Sontara" nonwoven nylon fabric attached to the top and bottom of an 8×8 scrim of 1000 denier multifilament fiberglass, the cylinder 210 of FIG. 3 is preferably covered with a thermal insulative coating that slows the heat flow from the ultrasonically heated carpet elements to the cylinder. This is believed to make the ultrasonic heating more efficient. One such coating that has been found to work is a TFE coated fiberglass made by the CHEMFAB company in Merrimack, N.H., designated Premium Series 350-6A. An acrylic adhesive may be used to attach the coating to the metal cylinder. The TFE surface keeps the backing substrate from sticking to the coating. The thickness of the coating may provide some resilience to the cylinder surface to reduce concentrations of force due to dimensional variations in the elements that may produce "hot spots" as the tuftstring is bonded to the backing. If a thicker backing structure is used that provides some load distribution during bonding, or if the speed of the tuftstring under the horn is greater than about 10 yd/min so significant heat transfer to the cylinder cannot occur in the time available, then such a coating may not be needed.

Figure 5:
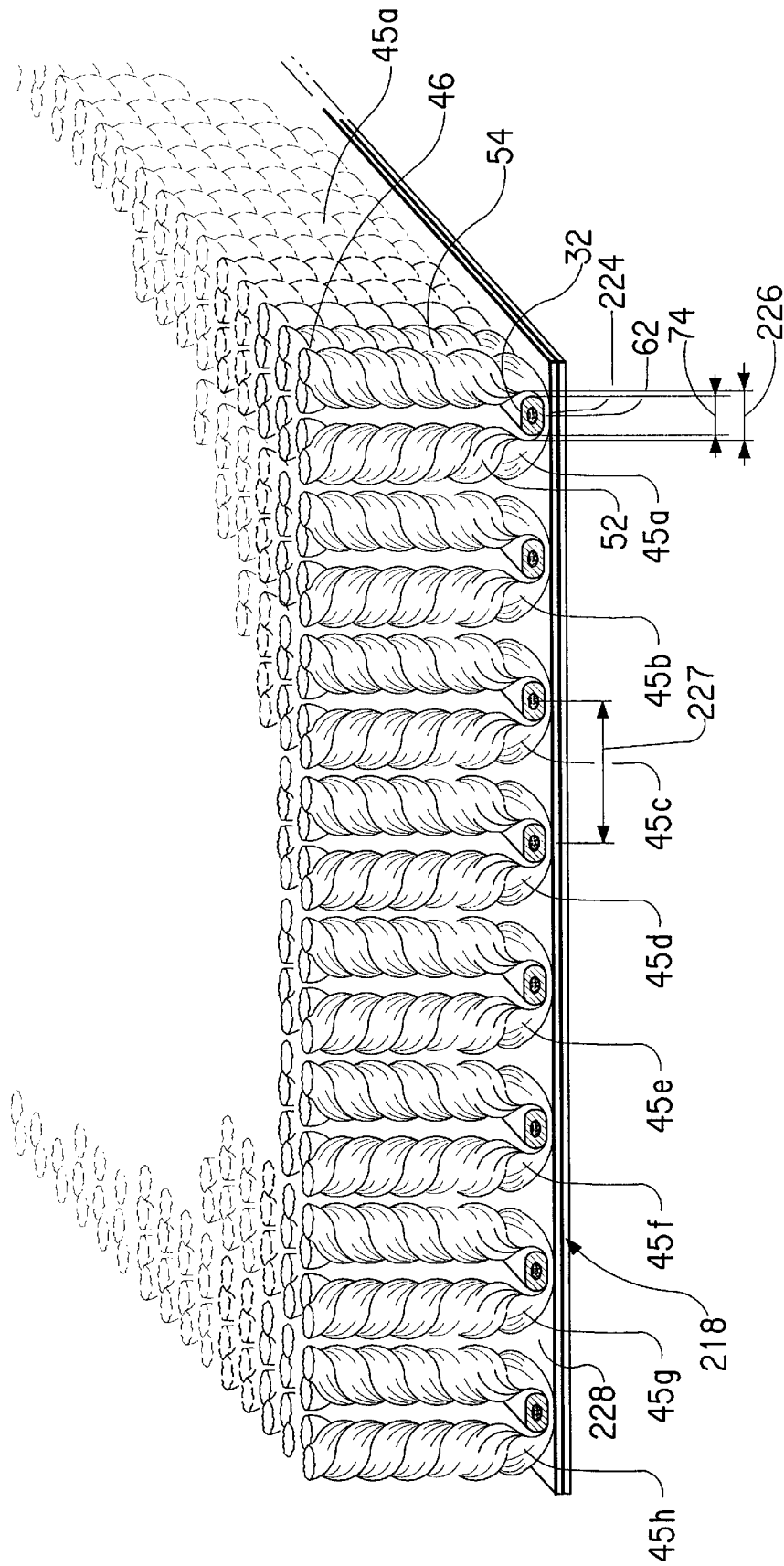
FIG. 5 is a diagrammatic end view of a portion of a pile surface structure.

FIG. 5 is a typical partial end view of a moisture stable carpet (made on the device of FIG. 3) viewed in a direction perpendicular to the axis of the cylinder and parallel to the elongated axis of the tuftstring. Each of the cut tuftstring segments 45a–h comprises a plurality of bundles of filaments, or tufts, secured to support strand 32. For instance, filament bundle 46 is bent in the shape of a "U" defined by a pair of upstanding tufts 52 and 54 extending upward from a base 224 and spaced from each other adjacent the base at 226. Each of the bundles has a dense portion of filaments 62 bonded to each other and secured to the peripheral surface of the support strand 32 at the base. Each of the bundles forms an acute angle with the dense portion at the base. The support strand has a width 74 that is equal to or less than the distance 226 between the upstanding tufts. The tuftstrings are spaced a selected distance apart, such as at 227, based on the desired density of tufts on the carpet, and are bonded along their length to the surface 228 of backing 218. In the embodiment shown, the reinforced support strand 32 is bonded on the inside of the "U" shaped bundles, and the bottom side of the tuftstring, that is, the bottom of the bonded "U" shaped bundles, is bonded to the surface of the backing. In another embodiment, the strand may be bonded to the outside of the "U" shaped bundle, and then the strand would be bonded to the surface of the backing when attaching the tuftstring to the backing.

Preferably, the tuftstring, or pile article, comprises a support strand having a surface of thermoplastic polymer, and a plurality of bundles of filaments of thermoplastic polymer, each bundle defining a pair of tufts, the tufts in said pair bent at an angle at a base and extending upwardly therefrom, the tufts defining a spaced distance therebetween adjacent said base, each of said bundles having a dense portion of filaments bonded together and secured to the surface of the support strand at said base by fusion of the thermoplastic polymer of the support strand and the filaments, said support strand having a width that is equal to or less than the distance between the tufts in said pair.

Figure 6:
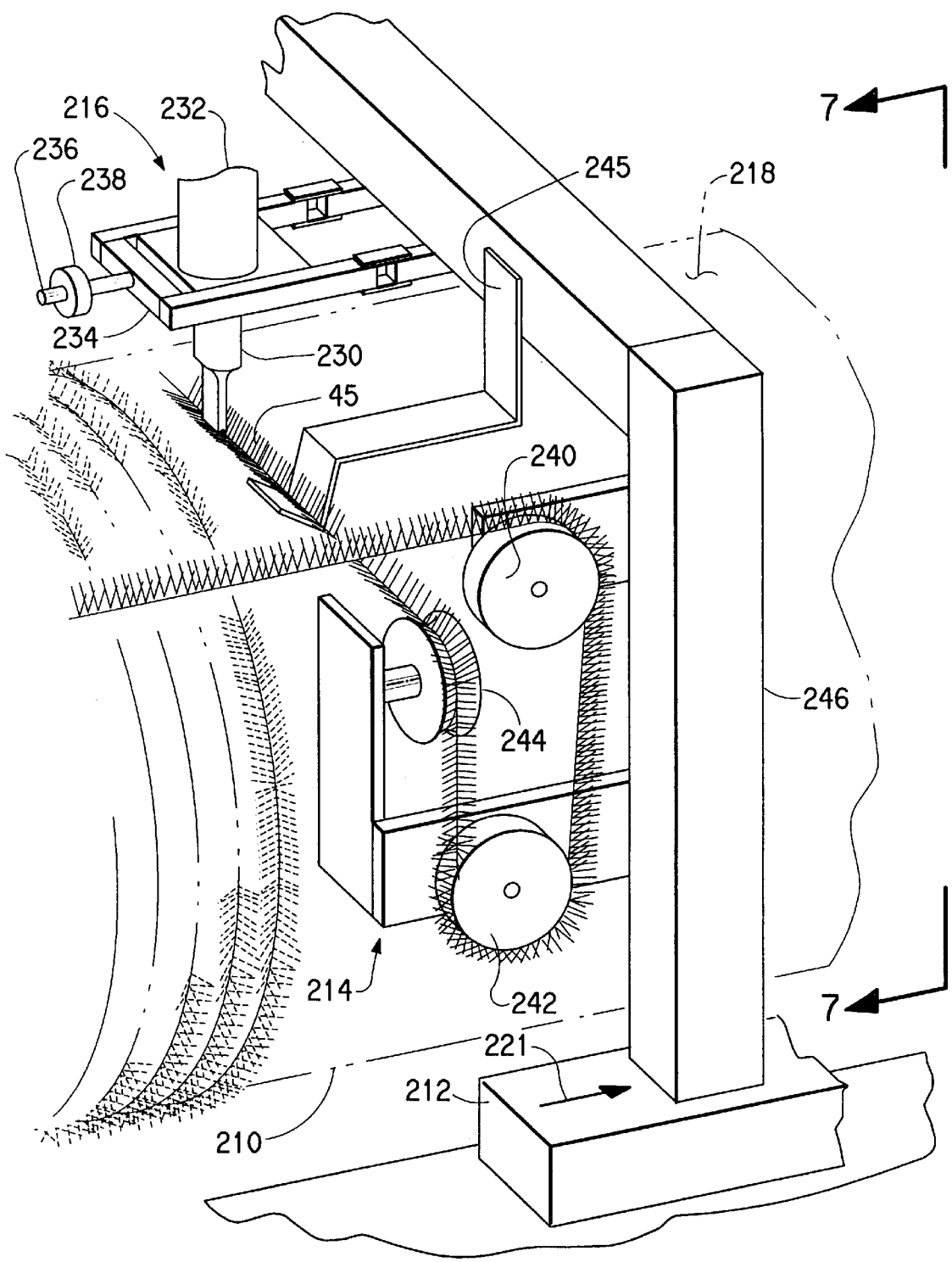
FIG. 6 is an enlarged diagrammatic view of the guiding and bonding devices of FIG. 3.

It is important that the tuftstring be carefully guided onto the cylinder 210 and under the ultrasonic bonding device 216. FIG. 6 is a close-up view of a portion of FIG. 3 showing the tuftstring 45 as it is guided onto cylinder 210, covered with backing 218, by tensioning and guiding device 214. The ultrasonic bonding device 216 consists of at least one ultrasonic horn 230 and ultrasonic driver 232 attached to a flexible mount 234 that allows the horn and driver to move freely in a radial direction relative to the cylinder. An arm 236 on the mount 234 permits weights, such as weight 238, to be added to control the force the horn exerts on the tuftstring. The tensioning and guiding device consists of V-groove tensioning wheels 240 and 242, guide wheel 244, guide groove 245, and other guides better seen in FIGS. 7 and 8. The V-groove in wheels 240 and 242 keeps the tuftstring upright and grips it so the magnetic torque of the tensioning wheels can resist the pull of the tuftstring by the rotating cylinder, and thereby apply tension. The magnetic tensioning wheels can be obtained from TEXTROL, INC. of Monroe, N.C. The tuftstring twists 90 degrees between tensioning wheel 242 and guide wheel 244 which also has a V-groove. The tensioning and guiding device 214 and bonding device 216 are attached to frame member 246 that is attached to traveling carriage 212.

Figure 7:
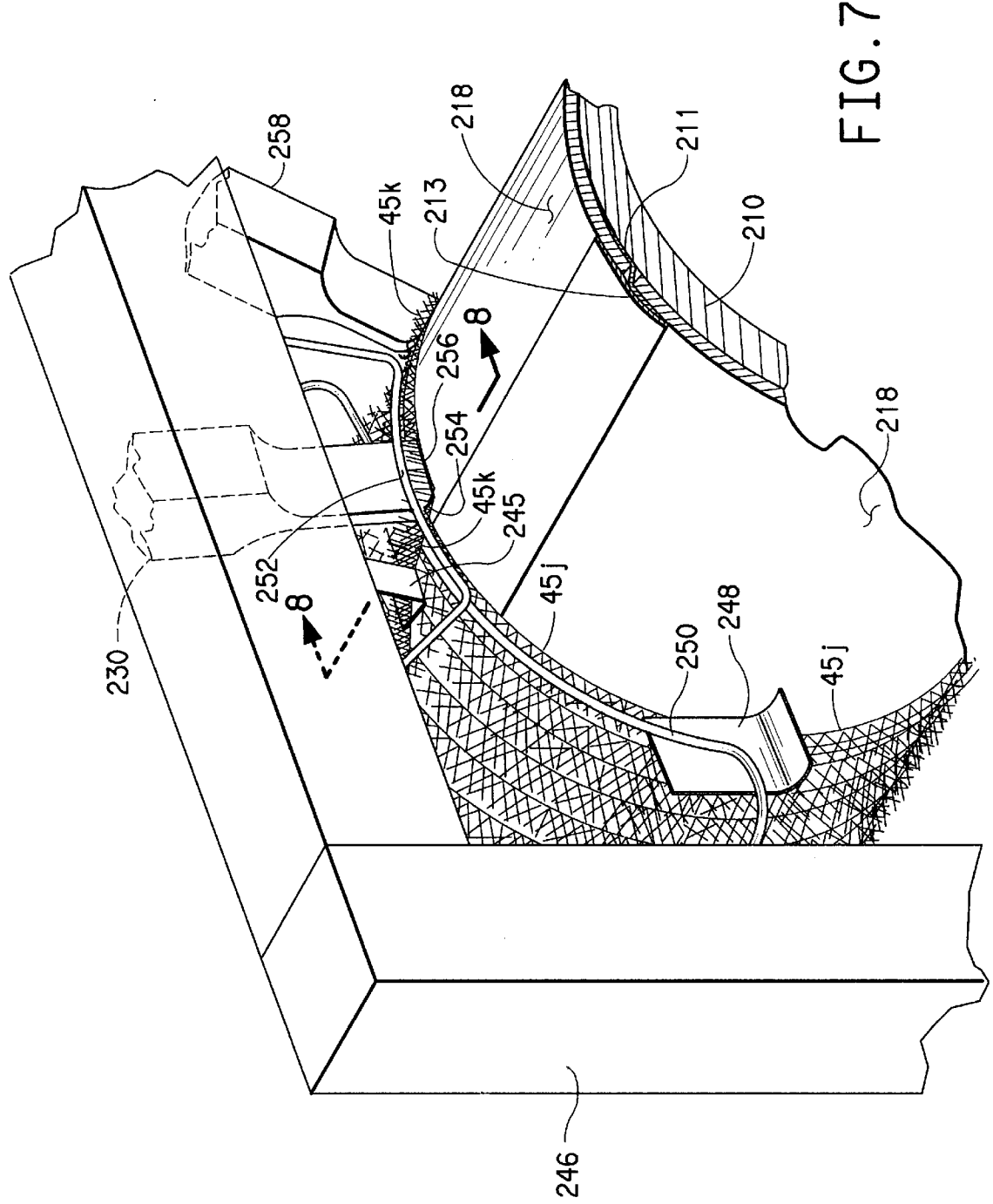
FIG. 7 is a partial end view of the guiding and bonding devices of FIG. 6.

FIG. 7 is view 7—7 from FIG. 6 that shows further details of how the tuftstring may be guided. It is important that the upstanding tufts of the adjacent tuftstring already on the cylinder do not get trapped under the incoming tuftstring being bonded to the backing on the cylinder. It is also important that the incoming tuftstring be positioned with the tufts upright and the strand directly under the ultrasonic horn. To accomplish these ends, in FIG. 7 a guide rod 250 is attached to frame member 246 and follows the contour of the cylinder close to the backing and presses sideways against the upstanding tufts of tuftstring 45j to hold them away from the incoming tuftstring 45k and ultrasonic horn 230. A guide plate 248 is attached to guide rod 250 and is placed close to the backing 218 and at an angle to the bonded tuftstring 45j. Another guide rod 252 is attached to frame member 246 and is placed close to the incoming tuftstring to keep the upstanding tufts upright and assist in guiding the incoming tuftstring 45k under the horn 230. FIG. 8 shows another view 6—6 from FIG. 7 of guide rods 250 and 252 just in front of the horn 230. Guiding of tuftstrings 45j and 45k keeps the tufts from getting bent over and trapped under the horn 230 or between the tuftstring 45k and the backing 218 during bonding. To assist in alignment of the tuftstring under the horn, the leading edge 254 of the horn 230 (FIG. 7) is radiused and this edge and the bottom edge are contoured to receive the strand that comes in direct contact with the surface of the horn. In the case of an elliptical strand surface (after bonding with the yarn), these horn edges would be a concave radiused surface which can be seen in FIG. 8 at bottom surface 256. During high energy vibration of the horn this contoured surface helps keep the strand from sliding out from under the horn.

FIG. 7 also shows another ultrasonic horn 258 that is useful when assembling the tuftstring to the backing at high speeds, such as about 10–25 YPM tuftstring speed, and when high bonding reliability is required. Horn 258 is located close to horn 230 so the tuftstring 45k is still hot from horn 230 when it is bonded by horn 258. In this way, the heating is partially cumulative and the total energy needs for bonding can be shared by two horns. This permits operating at high speeds which requires high bonding energy. At low speeds, second horn 258 is useful for "re-bonding" the tuftstring and improving bond reliability by bonding areas that may have been missed by horn 230. It may also be useful to use horn 230 just to accurately tack the tuftstring in place with low vibration and force, and use horn 258 to firmly attach the tuftstring with high energy and force without the problem of the tuftstring moving around under the horn before bonding. This two horn technique may also be useful for attaching pile yarns to the support strand, particularly at high speeds.

Bonding means other than ultrasonic bonding may be employed to attach the yarn bundle to the strand and to attach the tuftstring to the backing. Such means may be solvent bonding or thermal bonding with, for instance, a hot bar; or some combination of solvent, conductive, and ultrasonic bonding. It is preferred that the bonding occurs without the separate addition of adhesive material to the tuftstring or backing when joining the tuftstring to the backing, however, it is within the scope of the invention to include the addition of adhesive in the bonding area to achieve bonding between dissimilar thermoplastic polymers or to enhance ultrasonic bonding. Bonding using an adhesive may also be achieved using methods described in above-referenced co-pending U.S. patent application Ser. No. 07/017,162. When using an additional adhesive component, care must be taken that the adhesive type and quantity used does not compromise the moisture stability of the resulting assembly.

In operation of the device of FIGS. 1 and 3, yarn from source 22 and strand from roll 33 are fed to mandrel 30 where the strand travels along ridge 40 and to drive roll 201 in the forwarding and tensioning assembly 206. The yarn 20 is wrapped around the mandrel and strand and bonded to the strand by ultrasonic horn 42 to make tuftstring 45. The tuftstring is threaded through the apparatus to cylinder 210. Backing 218 is attached to cylinder 210 by tape 211 and is wrapped around the cylinder and cut to form a butt seam and taped to itself by tape 213 as shown in FIG. 7. The end of the tuftstring is threaded under the horn 230, and horn 258 if used, and taped to the backing at the far left of the cylinder 210 where the carriage 212 is positioned for startup. Rotation of the cylinder 210 can now be started and the ultrasonic horn energized to bond the tuftstring to the backing; the cylinder 210 acts as the ultrasonic anvil. Carriage 212 is geared to the cylinder rotation so it traverses the desired pitch, say about 0.2", for one revolution to advance the tuftstring along the cylinder and buildup a spiral array of tuftstring on the backing on the cylinder. When the carriage has traversed all the way to the right of the cylinder, the process is stopped and the carpet wound on the cylinder is cut along the tape seam for the backing and removed from the cylinder. The process can then be repeated. To control the speed and tension in the process, the speed of cylinder 210 can be constant and tuftstring drive roll 201 can vary slightly in speed to keep the tension monitored by tensiometer 211 constant. The speed of strand forwarding roll assembly 207 can also vary slightly in speed to keep the tension monitored by tensiometer 209 constant.

Although the system shown in FIG. 3 for making the carpet winds only a single tuftstring, it is within the scope of the invention to wind multiple tuftstrings and provide an ultrasonic horn that has multiple blades closely spaced for bonding multiple tuftstrings simultaneously using a single ultrasonic energizer. A plurality of these multiple blade horns could be arranged along a cylinder so numerous tuftstrings could all be bonded at once and a complete carpet made rapidly with only a few complete revolutions of the cylinder.

Figure 10:
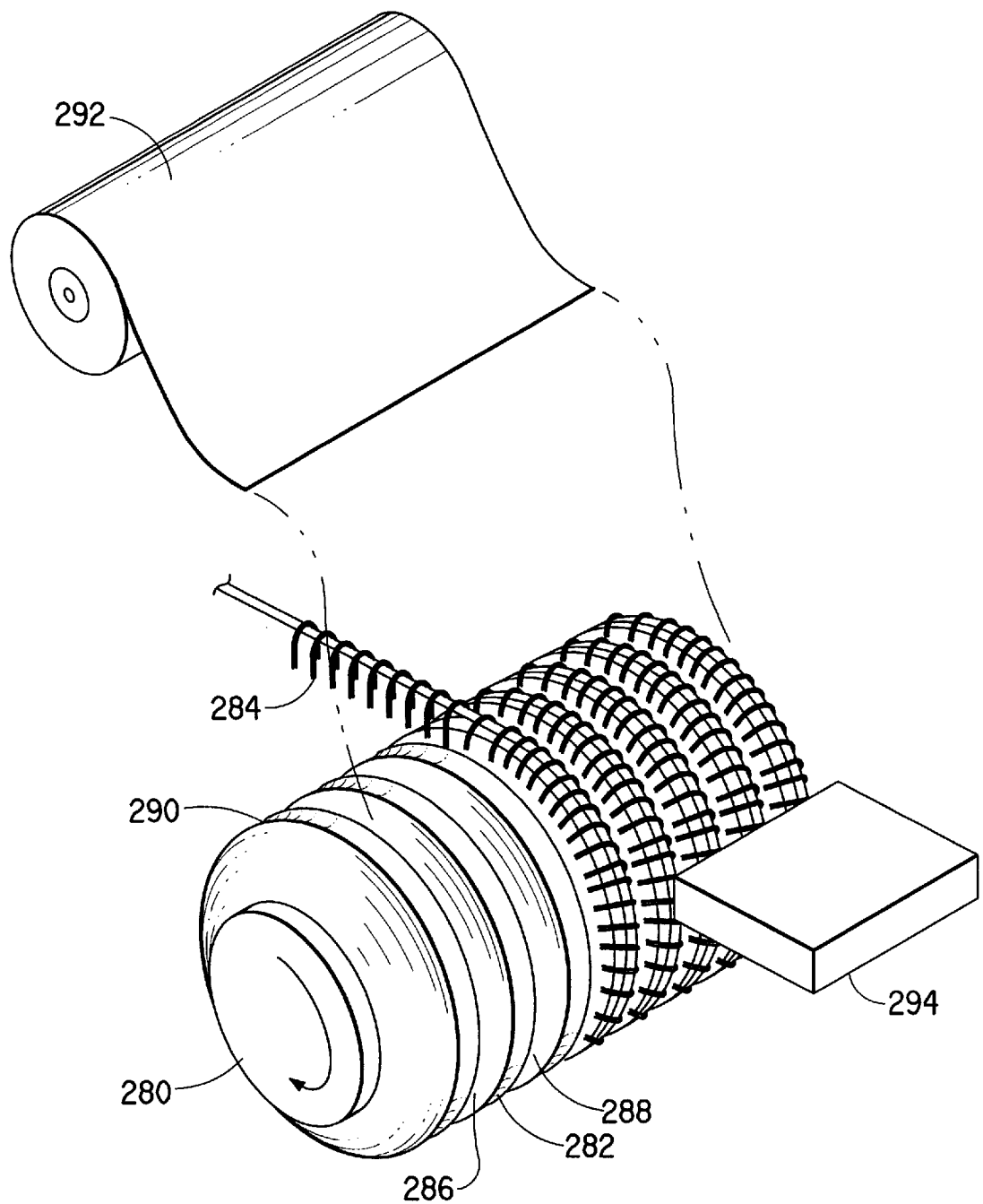
FIG. 10 is a diagrammatic view of an alternate system for assembling tuftstrings to a backing.

Although the system for automated assembly of tuftstring to a backing in FIG. 3 shows the pile surface assembly being made with the backing on the inside and the tufts on the outside with the ultrasonic energy being applied from the topside of the backing, the opposite construction with the pile on the inside and the backing on the outside is possible with the ultrasonic energy being applied from the backside of the backing. FIG. 10 shows a diagrammatic view of an alternate embodiment where the cylinder 280 has a continuous helical rib 282 on the surface to support the tuftstring 284. There are spaces, such as spaces 286 and 288, on both sides of rib 282 to receive the tufts. The rib would have a groove 290 to receive the strand and prevent the strand from slipping off the rib and into the space between ribs. The tuftstring 284 would be wrapped under tension along the cylinder on the helical rib without any bonding to a backing. The backing 292 would then be fed onto the cylinder and wrapped around the tuftstring and secured as with tape. A wide ultrasonic horn 294 spanning several ribs could be used to progressively bond the backing to the tuftstring from one end of the cylinder to the other as the cylinder makes several revolutions. The assembled backing and tuftstring would then be slit axially along the cylinder and the pile surface structure, or carpet, removed and rolled out flat.

Although the systems shown in FIGS. 3 and 10 show a batch process for making a carpet assembly, it is within the scope of the invention to make a continuous length of carpet by a warp process where there are enough tuftstrings fed to the cylinder for an entire carpet width, and the cylinder serves as an anvil and a transport roll in the process. The backing would only make a partial wrap around the cylinder sufficient to bond the plurality of tuftstrings using multiple ultrasonic horns. In the FIG. 3 embodiment where the tufts are facing outward from the cylinder, one horn may have a plurality of blades for bonding a plurality of tuftstrings at once. In the FIG. 10 embodiment where the tufts are facing in toward the cylinder, the cylinder would have a plurality of parallel ribs or discs (rather than a continuous helical rib) to support all the tuftstrings as they wrap partially around the cylinder and are bonded by a plurality of horns, with each spanning several ribs. In both cases, the tuftstrings may be supplied inline from a plurality of mandrels, or the tuftstrings may be made off-line and supplied from rolls or piddle cans.

The pile surface article shown in FIG. 5 provides a very lightweight carpet structure. A conventional tufted cut-pile carpet with the necessary latex adhesive and secondary backing typically has about 50% of its weight in the tufting yarn and about 50% in the backings and latex for a 30 oz/sq yd carpet (yarn weight). The lightweight carpet of the invention has about 75% of its weight in the yarn and only 25% in the backing. For a typical roll of 30 oz/sq yd carpet containing about 120 sq yd of carpet, the roll weight of a conventional carpet would be about 200 pounds more than a roll of carpet made according to the invention. For the conventional carpet, this results in higher shipping costs, more strenuous installation, and more waste in the landfill when the carpet is worn out. The latex in the conventional carpet, that contributes to the higher weight, also is very difficult to mechanically separate from the nylon face yarn and is very difficult to chemically separate from nylon polymer, and so makes recycling of the nylon economically unattractive. The nylon face yarn and nylon backing in the carpet of the invention can be easily recycled together without chemical contamination by the fiberglass reinforcing filaments.

The tuftstring carpet of this invention may be bulked after it has been assembled. This bulking provides the carpet with greater covering power. The pile yarn is further bulked by heating the pile of the tuftstring carpet. In one bulking operation, as described in co-pending, co-assigned U.S. Provisional Application entitled "Method for Bulking Tuftstring Carpets", Ser. No. 60/002,091, filed Aug. 10, 1995, the disclosure of which is hereby incorporated by reference, the tuftstring carpet is placed on a tenter frame and passed through an oven, where the pile yarn is heated with a rapidly flowing stream of hot air and then cooled. In the case of nylon 6,6 multifilament pile yarn, the air temperature may be in the range of about 90 to 150° C. which raises the temperature of the tuft filaments throughout the pile yarn to at least 90° C. For purposes of this invention, it is perferred that the temperature be in the range of about 125° C. to 180° C.

The invention is also useful for making moisture stable carpet structures which do not incorporate nylon in some or any of the elements. For instance, the moisture stable backing may be a conventional polypropylene backing that is a moisture stable polymer, and a nylon tuftstring could be attached using a hot melt adhesive. The adhesive should have a melting point that is higher than the melting point of the nylon tuftstring and higher than the polypropylene backing to cause some melting of the carpet elements and achieve good bonding. Since the nylon melt point is higher than the polypropylene, the hot adhesive should first be applied to the nylon and then allowed to cool momentarily before contacting the polypropylene. Such adhesives that should work are PEEK (polyetherether ketone) or polyimide adhesives. It may also be possible to achieve an adequate bond using a low melting adhesive that flows around and mechanically engages the filaments in the tuftstring and backing. Such adhesives may be conventional hot melts made from copolymers of nylon. In FIG. 6, the adhesive may be applied to the bottom of the tuftstring at the position of guide 245. It may also be possible to use a curable adhesive, such as an epoxy adhesive, instead of a hot melt, as long as the epoxy is tacky enough to hold the tuftstring in place on the backing on the cylinder until the adhesive cures. Heat could be applied to the carpet on the cylinder to accelerate the cure, which may also assist in bulking the tufts. For recycling the carpet elements, it should be possible to peel the tuftstrings from the backing with the aid of heat or chemicals to soften the adhesive. The separated different polymer elements could then be easily recycled.

The following Table I shows a matrix of some of the combinations that are illustrative of the moisture stable carpet assembly of the invention. Following the guidelines taught herein, other combinations using other polymers may also be possible.

TABLE I

| MOISTURE STABLE CARPET ELEMENTS | ILLUSTRATIVE MATERIAL COMBINATIONS | | | | | | | |
|---|---|---|---|---|---|---|---|---|
| TUFTSTRING | | | | | | | | |
| - tuft | N | N | N | PET | PP | N | N | N |
| - strand | N/G | N/G | N | PET | PP | N | N | N/G |
| BACKING | | | | | | | | |
| - XD | N/G | N/G | N/G | PET | PP | PP/G | PET/G | PP |
| - MD | N/G | N | N/G | PET | PP | PP/G | PET/G | PP |
| SEPARATE BONDING ADHESIVE (TS to backing) | no | no | no | no | no | yes | yes | yes |

(NOTE: N = nylon; G = glass; PET = polyethylene terephthalate; PP = polypropylene)

When combining moisture stable and moisture sensitive materials to achieve a moisture stable pile surface structure (tuftstring carpet assembly), there are three important considerations for the structural elements such as the strand and the backing. These are: 1) the moisture response of the individual element; 2) the longitudinal or in-plane stiffness of the individual element; and 3) the desired moisture response of the composite structure. When a moisture sensitive element is combined with a moisture stable element, the moisture response of the composite element can be determined using composite design theory. Basically, the stiffness ratio of the moisture stable element to the moisture sensitive element, for instance the backing compared to the strand, must be greater than a value which can be estimated and then adjusted based on experimentation.

The stiffness ratio can be expressed as follows:

Sb/Ss=(Es−Ec)/(Ec−Eb), where Sb is the stiffness per width increment of the moisture stable element (such as the backing), Ss is the stiffness per width increment of the moisture sensitive element (such as the strand), Es is the maximum moisture responsive strain of a strand, Ec is the maximum moisture responsive strain of a unit width of composite carpet structure associated with a single strand, and Eb is the maximum moisture responsive strain of a unit width of backing associated with a single strand.

Note that Ec should always fall somewhere between Es and Eb. In the case of an unreinforced nylon strand with Es=0.03 and a glass reinforced nylon backing with Eb=0.005, and a desired moisture responsive strain in the composite structure of Ec=0.01, the stiffness ratio would be 4. That is, the backing needs to be about 4 times stiffer than the strand. Specifying the strand denier and the polymer used for making the backing, the denier of the desired reinforcing filament can be calculated and used as a starting point for experimentation. Other variables, such as the degree of adhesion between the elements, the draw stress in the polymers of the elements, polymer additives, and the like will affect the final composite performance, and some adjustment in the stiffness of the elements may have to be made to achieve the desired composite performance.

There are also other variations possible with the carpet assembly of the invention using tufts attached to a strand to form tuftstrings that are attached to a backing. By providing multiple yarns in the yarn supply 20, such as 20*a* and 20*b*, and winding them on the mandrel 30 as shown in FIG. 1, it is possible to distribute a variation in the yarn in a controlled manner throughout the face of the carpet. Although variations in the cross direction (XD) are possible in both the conventional and tuftstring carpets by making variations in the yarns from one strand to the next or one tuftstring to the next in the XD, variations in the MD are not possible in the case of a conventional tufted carpet that introduces only a single continuous strand repeatedly in a straight or zigzag line in the machine direction (MD) of the carpet. It may be desired, for instance, to sparsely introduce a particular effect throughout the face of the carpet. Such an effect may be a colored yarn, an antistatic yarn, an antimicrobial yarn or one with other chemical features, an inexpensive yarn, a yarn with different texture, twist level, finish, denier, etc. For instance, the supplied yarn 20 for one tuftstring may comprise three yarns with only one of them being the desired effect yarn, and the next adjacent two tuftstrings assembled to the backing may not have the effect yarn at all. The effect then is distributed sparsely in both the MD and XD of the carpet.

Referring to FIG. 9, tuftstring 260 has ⅓ of the pile yarns, such as shaded yarns 262*a* and 262*b* containing antistatic filaments. Tuftstrings 264 and 266 do not contain any yarns with antistatic filaments. Tuftstring 268 also contains antistatic filaments in the pile yarns, such as shaded yarns 270*a* and 270*b*. This provides a controlled distribution of an effect yarn throughout the face of the carpet of the invention in both the XD and MD.

The use of a continuous strand in the carpet assembly offers the possibility for additional variations in the carpet of the invention which would not be possible with conventional tufted carpets without costly additional steps after the carpet has been formed. For instance, antistatic filaments may be incorporated in some or all of the tuftstring support strands by blending it in with the fiberglass filament bundle in the core of the strand during strand formation. This would be combined with antistatic filaments in some or all of the tuft yarns to provide enhanced antistatic performance for computer rooms and the like where low static voltage buildup is important. The antistatic filaments in all the strands may be grounded.

Referring to FIG. 9, tuftstring 260 with antistatic tuft yarns has antistatic filaments 272 and tuftstring 268 with antistatic tuft yarn has antistatic filaments 274. These filaments can extend continuously across the width of the carpet as can be seen with filaments 274 at the opposite end 276 of tuftstring 268. Both ends of filaments 274 could be grounded to enhance static removal from the carpet.

It may also be possible to transmit signals from one edge of the carpet to the other through the strands by incorporating a continuous strand of wire or an optical fiber in the fiberglass bundle in some or all of the tuftstrings. In the case of a wire, it could also function as an antenna, an electromagnetic shield, or a tracking wire for guiding a robotic vehicle along the carpet surface from one edge of the carpet to the other in a predetermined path. Such a robotic vehicle may be a vacuum cleaner that could automatically travel back and forth across the carpet for cleaning. The signal could also be used in conjunction with an electronic pet control collar to restrict pet access to all of the carpet or to certain parts of the room. If a small insulated wire is used in the strand, with a polymer coating different than the strand polymer, it could also serve to transmit electrical power safely from one edge of the carpet to the other. Other variations in effects and functionalities that are inherently possible with the tuftstring carpet assembly will be evident to those skilled in the art using the teachings herein.

The present invention is further illustrated by the following Examples using the below Test Methods, but these Examples should not be considered as limiting the scope of the invention.

TEST METHODS

Moisture Stability

The following procedures, Test A or Test B, are used for measuring the moisture stability of the tuftstring carpet assembly (pile surface structure).

Test A

1. Fabricate a finished piece of the tuftstring carpet.

2. Cut at least 5 samples out of the carpet piece. These samples should measure 40 cm long in the tuftstring direction (T/SD) and 40 cm long in the cross direction (XD), i.e., 90 degrees to the tuftstring direction.

3. On the back of each sample, draw a line through the center of the sample from edge to edge in the T/SD and XD and place a staple across each line at 2.5 cm from one edge and at 37.5 cm from the same edge. The staples provide end points for the narrow reference lines running between them and will not be affected by heat, moisture, and handling. As described below, measurements are taken along these reference lines.

4. Place the sample in the center of a piece of stainless screen with ¼" grid spacing with the face yarn against the screen and the backing with the reference lines facing up.

5. Submerge the sample on the screen in a circulating water bath heated to 40° C. for at least 48 hours. This defines the "wet" condition of the sample which is considered to be 100% RH.

6. Remove the sample from the bath by lifting the screen without disturbing the sample and allow the sample to drain for about 20–30 minutes until the water stops dripping from the sample.

7. Measure the distance between the staples in the T/SD and XD with a millimeter scale and record the values to the nearest 0.05 millimeter.

8. Place the sample on the screen in an oven heated to 40° C. and positioned to allow air to circulate around the top, sides, and bottom of the sample. Close the oven door and purge the oven with a continuous flow of low pressure nitrogen and vent the oven.

9. Monitor the oven humidity with a hydrometer placed in the bottom of the oven and record when the oven humidity is 3% RH or less. This defines the "dry" condition of the sample which is considered to be 3% RH or less.

10. Hold the sample in the oven for at least 24 hours with the humidity maintained at 3% RH or less.

11. Remove the sample from the oven by lifting the screen without disturbing the sample and rapidly measure the distance between the staples in the T/SD and XD with a millimeter scale and record the values to the nearest 0.05 millimeter.

12. Calculate the percent dimension change in both the T/SD and XD by subtracting the wet dimension from the dry dimension and dividing by the wet dimension.

13. Collect the data from at least 5 samples and average the percent changes to obtain an average % change in the T/SD and an average % change in the XD.

All 5 samples may be placed in the water bath and oven at the same time and the data collected on all samples at the same time if the bath and oven will hold the samples spaced apart without disturbing one another. A rack to support the screens may be used to support 6 samples at a time in both the water bath and the oven. When removing samples from the oven, only one sample at a time would be removed and measured.

A variety of ovens and hydrometers may be used. The oven used for the 6 samples labeled single-cycle data was a VWR Scientific oven model 1450 DS, catalog #52201-650. The hydrometer used to monitor humidity in the oven was an Airguide hydrometer obtained from VWR Scientific, catalog #35521-087 which has a stated accuracy of +/−1–3% RH.

Test B

In Test B, steps 1–13 as described above in Test A are used with the following modifications.

In step #8, the oven is not initially purged with nitrogen and the humidity is only reduced to about 14% RH. The samples are then placed in plastic bags and transferred to a second oven. The samples are removed from the plastic bags and placed in the second oven. This oven is purged with nitrogen and the oven humidity is reduced to 3% RH or less. The samples are held in this oven for at least 24 hours with the humidity maintained at 3% RH or less.

Measurement of Feed Yarn Bulk

Yarn bulk was measured using the method described in Robinson & Thompson, U.S. Pat. No. 4,295,252, the disclosure of which is hereby incorporated by reference. The yarn bulk levels are reported herein as % bulk crimp elongation (% BCE) as described in Robinson & Thompson. The bulk measurements were made at 11 m/min for 1.5 minutes using a sample length of 16.5 meters. The tensioning weight used was 0.1 gram/denier (0.11 g/dtex). The pressure of the air in the heat-setting chamber was 0.05 inches of water, and the temperature of the heating air was 170 +/−3° C.

EXAMPLES

Example 1

Nylon Tuftstring Carpet Construction

In below Table II, the tuftstring carpet samples were cut from a tuftstring carpet having solution-dyed nylon 6,6 face yarn which was fusion-bonded using about 48 watts/strand of ultrasonic energy to a nylon 6,6 support strand reinforced with glass fibers. The nylon 6,6 face yarn was made from two yarn strands of 1235 denier moss green, solution dyed, commercial grade (DSDN) yarn, available from DuPont (Wilmington, Del.), that were ply-twisted and heatset with a twist level of about 4 tpi and a total denier of about 3100. The component singles yarns of the ply-twisted yarn had a BCE % of about 31 and a dpf of about 19. The support strand had a denier of 3900 and a glass-to-nylon ratio of 0.13. The nylon 6,6 face yarn was placed on the strand at a density of 12 tuft pairs per inch and cut to form a 0.5 inch pile height. The tuftstrings were fusion-bonded using ultrasonic energy to a nylon 6,6 Sontara® and glass fiber laminate comprising a top layer of 1 oz/yd$^2$ of nylon 6,6 Sontara®, a middle layer of fiberglass scrim of 6 strands per inch in the MD having a strength/strand of 8 lbs. and 10 strands per inch in the XD having a strength/strand of 16 lbs coated with an acrylic adhesive, and a bottom layer of 1 oz/yd$^2$ of nylon 6,6 Sontara®.

The tuftstrings were attached at a density of 5 strands per inch to provide a carpet with a yarn face weight of about 25 oz/yd$^2$ using ultrasonic energy of 93 watts/tuftstring. The tuftstrings and carpet were formed on a tuftstring forming module and belt module at a speed of about 10 ypm as described in co-pending, co-assigned U.S. patent application Ser. No. 08/513,734 filed Aug. 10, 1995, the disclosure of which is hereby incorporated by reference.

In the tuftstring forming module, the face yarn is wrapped over four strands on a square mandrel and passed under two ultrasonic horns; two strands at a time are bonded to the yarn by a single ultrasonic horn engaging two corners of the mandrel. The yarn is cut between strands while still on the mandrel and the four tuftstrings thus formed are directed to a belt forming module which contains a loop of backing substrate driven by a plurality of rolls. The four tuftstrings are guided under an ultrasonic horn positioned over one of the rolls, with the horn having four forks engaging each tuftstring to fusion bond the four tuftstrings to the backing at one time. A second horn following the first provides additional bonding energy. The four tuftstrings are traversed along the bonding roll to spirally wrap the tuftstrings on the backing to form a three foot wide carpet sample twelve feet long. The carpet sample loop is cut from the rolls and the test samples are cut from this carpet sample.

Since the nylon 6,6 face yarn was solution-dyed, and no latex was used in the assembly, the carpet was not subject to heat during assembly and was therefore not bulked. To bulk the carpet, a separate bulking process was used as described in the referenced co-pending, co-assigned U.S. Provisional Patent Application entitled "Method for Bulking Tuftstring Carpets". In this process, the face yarn was heated in a tenter frame with a rapidly flowing stream of hot air and cooled before release from the tenter pins.

Nylon tuftstring carpet Samples 1–6 were tested for moisture stability, using the procedures described in Test A above, and the results are reported below in Table II. The average length % change was 2% or less which indicates this carpet structure is a moisture stable tuftstring carpet assembly.

Example 2

Polypropylene Tuftstring Carpet Construction

In below Table III, the tuftstring carpet samples were cut from a tuftstring carpet having polypropylene face yarn which was solution-dyed and fusion-bonded using ultrasonic energy to a polypropylene support strand comprising a polypropylene monofilament. The polypropylene face yarn was made from two 1200 denier, bulked, continuous filament yarn strands that were ply-twisted and heat-set with a twist level of 3.75 tpi and a total denier of 2400. The support strand was a polypropylene monofilament having an oval cross-section with dimensions of 0.035×0.050 inches and a denier of 6765. The polypropylene face yarn was placed on the strand at a density of 11 tuft pairs per inch and cut to form a 0.5-inch pile height. The ultrasonic horn bonding energy for making the polypropylene tuftstring was about 28 watts. The tuftstrings were fusion bonded, using ultrasonic energy of 36 watts, to a two-layered woven polypropylene slit film backing, each layer having a weight of 10.4 g/ft$^2$.

The tuftstrings were attached at a density of 7 strands per inch to provide a carpet with a yarn face weight of about 25 oz/yd$^2$. The tuftstrings and carpet were formed on the device as illustrated in FIG. 3 at a speed of about 2 ypm. Since the polypropylene face yarn was soluzion-dyed and no latex was used in the assembly, the carpet was not subject to heat during assembly and was therefore not bulked. Bulking was achieved by blowing hot air having a temperature of about 95° C. on the tuftstring carpet immediately after bonding of the elongated pile article to the backing substrate on the drum.

Polypropylene tuftstring carpet Samples 1–5 were tested for moisture stability, using the procedures described in Test B above, and the results are reported below in Table III. The average length % change was 2% or less which indicates this carpet structure ic a moisture stable tuftstring carpet assembly.

Example 3

Polyester Tuftstring Carpet Construction

In below Table IV, the tuftstring carpet samples were cut from a tuftstring carpet having polyester (polyethylene terephuhalate) face yarn and fusion bonded using ultrasonic energy to a polyester support strand having a sheath of polyester and a core of glass filaments. The polyester face yarn was made from two bulked staple yarn strands that were ply-twisted and heat-set with a twist level of about 4 tpi and a total denier of about 4357. The support strand had a glass filament core of 900 denier covered with a polyester sheath for a total denier of 4535. The polyester face yarn was placed on the strand at a density of 12 tuft pairs per inch and was cut to form a 0.5 inch pile height. The ultrasonic horn bonding energy for fusion bonding the face yarn to the strand to form the polyester tuftstring was about 25 watts. The tuftstrings were fusion bonded, using ultrasonic energy of about 50 watts, to a two layer backing substrate made from a bottom layer or polyester spunbonded sheet having a basis weight of 9.35 grams/ft$^2$ and a top layer of polyester/glass nonwoven sheet having a basis weight of 23.54 grams/ft$^2$. The top layer, which is in contact with the tuftstrings, consists of 25% glass staple fibers having lengths of 0.5 inches and diameters of 13 microns, that are well dispersed in the plane of the sheet; and 75% polyester globules adhered to the glass fibers. This top sheet is described in U.S. Pat. No. 5,134,016, the disclosure of which is hereby incorporated by reference. The two layers in the backing are fusion bonded together and to the tuftstring in one step. Using only this particular bottom layer, there were problems with ultrasonic bonding.

The tuftstrings were attached at a density of 5 strands per inch to provide a carpet with a yarn face weight of about 34 oz/yd$^2$. The tuftstrings and carpet were formed on the device as illustrated in FIG. 3 at a speed of about 2 ypm. The carpet was not bulked before testing. The polyester tuftstring carpet samples 1–6 were tested for moisture stability, using the procedures described in Test A above, and the results are reported below in Table IV. The average length % change was 2% or less which indicates this carpet structure is a moisture stable tuftstring carpet assembly.

Example 4

Nylon Tuftstring Carpet with Separate Bonding Adhesive

In below Table V, a single tuftstring carpet sample was made having nylon 6,6 face yarn which was solution dyed and fusion bonded using ultrasonic energy to a support strand having a nylon 6,6 sheath and a fiberglass filament core as described in Example 1. The tuftstrings were attached to a backing substrate using a separate adhesive placed between the tuftstrings and backing. The backing substrate was the same as that used in the examples of Table II. The separate adhesive was a single layer of Cytex FM 73M epoxy film having a basis weight of 0.03 pounds/ft$^2$.

The tuftstrings were attached to the backing substrate at a density of 5 strands per inch in a special fixture to provide a carpet sample about 13 inches square with a yarn face weight of about 25 oz/ft$^2$. The fixture consisted of a picture frame structure which held slats in an equally spaced parallel array of 5 slats/inch. The slats were about 14 inches long, 0.12 cm wide and 1.25 inches high. Thirteen inch lengths of tuftstrings were cut and placed on the slats of the fixture such that the tuft pairs were tucked down between the slats and the strand rested directly on the edge of a slat. In this way, the base of the tuftstrings were presented upward for placement of the adhesive layer and the backing substrate. "Kapton" tape was used at the ends of the frame to hold the tuftstrings in place. The adhesive layer was cut to cover the bases of all the tuftstrings and the backing substrate was cut to fit over the adhesive layer. The frame was then inverted to place the backing substrate down and it was placed between two ¼ inch aluminum plates that were slightly larger than the fixture. This assembly was then placed in a standard convection oven with a 50 pound weight placed on the top plate. The temperature in the oven was ramped from room temperature to 120° C. in 30 minutes, and then held at 120° C. for 1 hour. The oven was turned off and the sample was allowed to cool in the oven for about 2 hours under the pressure of the 50 pound weight, then the sample was removed from the fixture.

These nylon tuftstring carpet samples were tested for moisture stability according to the procedure of Test A above with the exception that the initial marks on the carpet were 30 cm apart. The results are reported below in Table V and show that the average length % change was 2% or less which indicates this carpet structure is a moisture stable tuftstring carpet assembly.

Example 5

Nylon Tuftstring Carpet Having Strands Made With Nylon 6,12 Monofilament

A nylon tuftstring carpet sample was made having solution dyed nylon 6,6 face yarn similar to Example 1, but a bisquit color, and fusion bonded to a nylon 6,12 monofilament strand to form a tuftstring, which was fusion bonded to a backing substrate of nylon 6,6 "Sontara" and glass fiber laminate. The backing substrate was the same as that described in Example 1. The nylon 6,12 monofilament strand consisted of an extruded single round filament of 25 mil diameter (about 2700 denier) with no glass reinforcing filaments. It is believed that if this nylon 6,12 monofilament strand were tested by itself according to the methods described in U.S. Pat. No. 5,470,656, it would be moisture stable. The nylon 6,6 face yarn was placed on the strand at a density of 12 tufts pairs per inch and cut to form a 0.5 inch pile height. The tuftstrings were fusion bonded using ultrasonic energy to the backing at a density of 5 strands per inch to provide a carpet with a yarn face weight of about 25 oz/sq yd. The tuftstrings and carpet were formed using the device described in FIG. 3. The carpet was bulked in a manner similar to that described in Example 1. It is believed that if this carpet were tested according to the procedure described in the above test methods, Moisture Stability (Test A), it would have an average (over 5 samples) length % change of 2% or less in the MD and XD. The actual average length % change based on only 2 tested samples was 1.21% MD and 0.07% XD indicating that this carpet would be a moisture stable tuftstring carpet assembly.

Example 6

Nylon Tuftstring Carpet Having Strands Made With A Nylon 6,6 Copolymer Staple Yarn Sheath Wrapped Over A Fiberglass Core A nylon tuftstring carpet sample was made having a face yarn of solution dyed nylon 6,6 similar to Example 1, but a bisquit color, and fusion bonded to a sheath/core strand having a nylon staple yarn sheath of nylon 6,6 copolymer containing 30% by weight of units derived from MPMD (2-methyl pentamethylene diamine) and a core of glass filaments to form a tuftstring which was fusion bonded to a backing substrate of nylon 6,6 "Sontara" and glass fiber laminate; The backing substrate was the same as that described in Example 1. The nylon staple yarn of nylon 6,6 copolymer containing 30% by weight of units derived from MPMD which was used as the sheath was made by conventional means. The strand was made by wrapping a single staple sliver of 1.5" staple length, 1.8 dpf of the nylon yarn over a continuous multifilament glass core of 1450 denier. The total denier of the strand was about 2700 and the glass-to-nylon area ratio was about 0.58. Although this strand had a higher ratio of glass-to-nylon than the sheath/core strand of Example 1, there was still good coverage of the glass and enough nylon polymer for good adhesion to the face yarn. This was believed to be due to the wrapped nylon staple yarn sheath having greater bulk than the solid extruded nylon polymer sheath. Higher denier strands with more staple fibers and a lower nylon/glass ratio would also work. The machine used for making this wrapped strand is the "DREF 3 Friction Spinning Machine" manufactured by Textilmachinenfabrik Dr. Ernst Fehrer AG of Linz, Austria. A similar machine is described in U.S. Pat. No. 4,779,410 to Fehrer. It is believed that if this strand were tested by itself according to the methods described in U.S. Pat. No. 5,470, 656, it would be moisture stable. The nylon 6,6 face yarn was placed on the strand at a density of 12 tufts pairs per inch and cut to form a 0.5 inch pile height.

Figure 11:
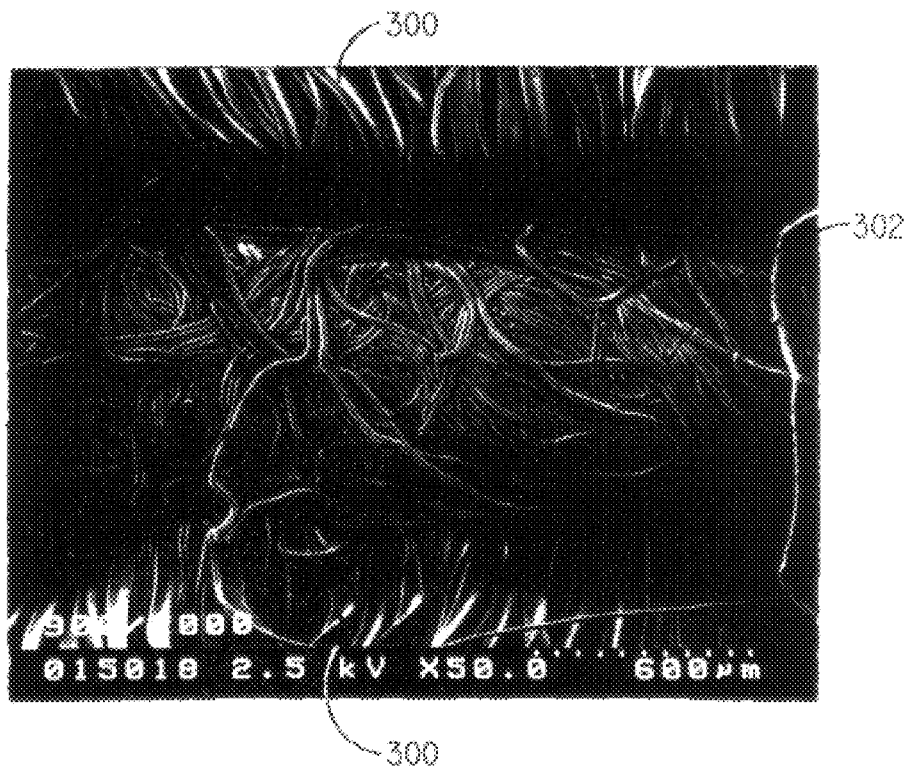
FIG. 11 is a photomicrograph of a planar view of a tuftstring having a strand with a nylon staple yarn sheath wrapped around a core of glass filaments.
Figure 12:
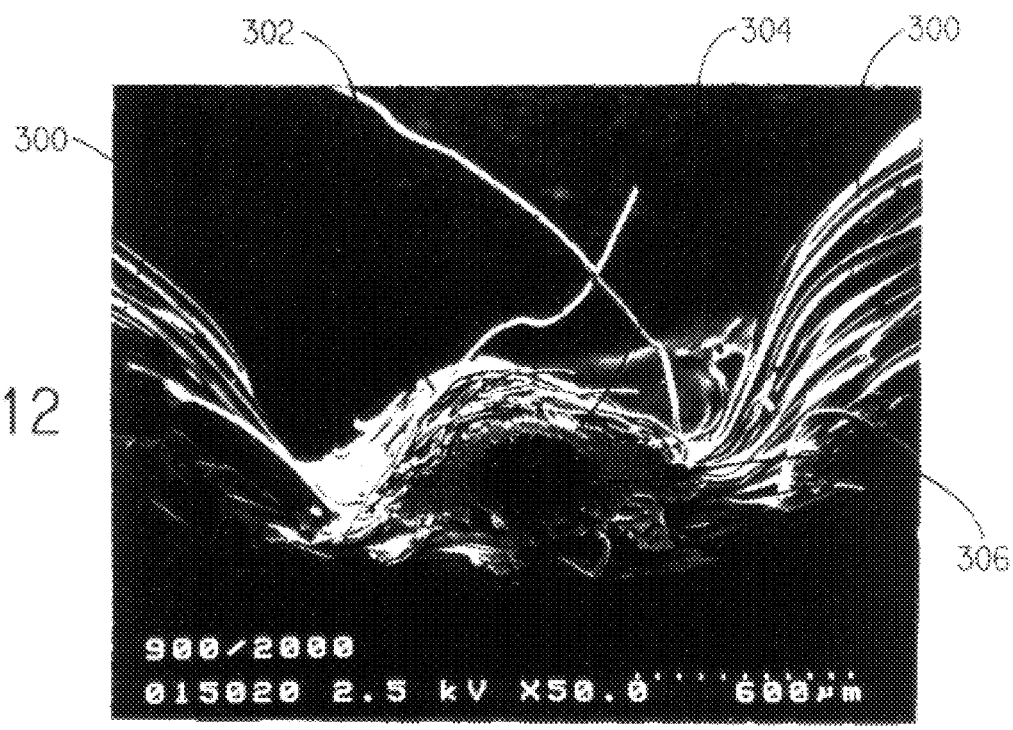
FIG. 12 is a photomicrograph of an end view of a tuftstring having a strand with a nylon staple yarn sheath wrapped around a core of glass filaments.

Photomicrographs of a top view and end view of a tuftstring similar to the tuftstrings described above are shown in FIGS. 11 and 12 respectively. As described above, these tuftstrings were made by bonding nylon face yarn tufts to a sheath/core strand having a nylon staple yarn sheath and a core of glass filaments. In the strands shown in FIGS. 11 and 12, the multfilament glass core has a denier of 900.

The tufts 300 are shown attached to the strand 302 comprised of the nylon staple yarn sheath 304 wrapped around core 306. It is believed that most of the sheath filaments become bonded together and some of them are bonded to the tuft filaments during the ultrasonic process for attaching the tufts. The tuftstrings were subsequently fusion bonded, using ultrasonic energy, to the backing at a density of 5 strands per inch to provide a carpet with a yarn face weight of about 25 oz/sq yd. The tuftstrings and carpet were formed using the device described in FIG. 3. The carpet was bulked in a manner similar to that described in Example 1. It is believed that if this carpet were tested according to the procedure described in the above test methods, Moisture Stability (Test A), it would have an average (over 5 samples) length % change of 2% or less in the MD and XD. The actual average length % change based on only 2 tested samples was 0.6% MD and 0.07% XD indicating that this carpet would be a moisture stable tuftstring carpet assembly.

The nylon staple yarn used in this Example 6 could also be a blend of staple filaments for special purposes. For instance, it may be desirable to make a blend of 5–25% by weight lower melting binder filaments (such as about 20% polypropylene filaments) with nylon 6,6/MPMD staple yarn, or unmodified nylon 6,6 staple yarn to produce a staple blend that is wrapped around the glass core. When ultrasonically bonded, the lower melting binder filaments may result in more cohesiveness for the strand in the axial direction and this may aid in resisting tuftstring damage during processing tensions, and resisting carpet damage due to installation and handling tensions and wear in use. Other possible blended staple filaments may include filaments having antistatic properties and such filaments could work with antistatic filaments in the tufts to reduce static buildup in the finished carpet.

Strands having other wrapped structures can also be used. For example, nylon bulked continuous filament (BCF) yarns may be wrapped around the fiberglass core using a rubber covering machine manufactured by OMM America located in Natick, Mass. For instance, two BCF yarns may be wrapped in opposite directions of rotation around the fiberglass core to achieve coverage of the core and a balanced twist structure. This wrapped strand would function similar to the nylon staple yarn wrapped strand, but the process would not have the same ease of blending in other polymer filaments for special functionalities.

In another embodiment, nylon staple yarn of nylon 6,6 copolymer containing 30% by weight of units derived from MPMD (2-methyl-pentamethylene diamine) can be used to make the upper and lower nylon "Sontara" layers of the backing substrate with glass fiber being used as the reinforcing layer and attached to the modified nylon 6,6 layers. It is believed that these backing substrates would be moisture stable and that the resulting tuftstring carpet assembly would be moisture stable. Further, these modified nylon 6,6 layers would have a melting point temperature of about 20 degrees C. lower than the melting point temperature of unmodified nylon 6,6 face yarn tufts. Thus, the tuftstrings could be fusion bonded to the backing substrate using ultrasonic energy applied to the backing with a back bonding device as shown in FIG. 10 and described in copending patent application Ser. No. 08/513,734 filed Aug. 10, 1995. It is believed that this carpet would have good adhesion between the face yarn and the strand and between the face yarn on the tuftstring and the backing. It is further believed that this adhesion could be obtained with the use of a lower level of ultrasonic energy than used in Example 1 or 7 and this would result in less damage to the face yarn filaments during the ultrasonic bonding of the tuftstring to the backing.

Example 7

Carpet Having Strand Made With A Nylon 6,6 Copolymer Extruded Sheath Over A Fiberglass Core A nylon tuftstring carpet sample was made having solution dyed nylon 6,6 face yarn similar to Example 1, but a bisquit color, and fusion bonded to a sheath/core strand with a sheath of nylon 6,6/6 copolymer having 85% by weight nylon 6,6 and 15% by weight nylon 6. This nylon copolymer which was used as the sheath was made by conventional means. This resultant nylon copolymer would be expected to have a melt temperature about 20 degrees C. below the melt temperature of the nylon 6,6 face yarn. A typical melt temperature for the solution dyed nylon face yarns is about 258° C. The tuftstring was fusion bonded to a backing of nylon 6,6 "Sontara" and glass fiber laminate. The backing was the same as that described in Example 1. The sheath/core support strand had a total denier of 3200, a glass denier of 900 and a glass-to-nylon ratio of 0.20 and an oval cross-section. It is believed that if this strand were tested by itself according to methods described in U.S. Pat. No. 5,470,656, it would be moisture stable. The nylon 6,6 face yarn was placed on the strand at a density of 12 tufts pairs per inch and cut to form a 0.5 inch pile height. The tuftstrings were fusion bonded using ultrasonic energy to the backing at a density of 5 strands per inch to provide a carpet with a yarn face weight of about 25 oz/sq yd. The tuftstrings were formed using the device described in FIG. 1 and the tuftstring was attached to the backing using a back bonding device described in FIG. 10 and in copending patent application Ser. No. 08/513,734 filed Aug. 10, 1995. The ultrasonic horn in the back bonding device does not contact the large mass of low melting strand directly. (In a separate experiment, when the top bonding device of FIG. 3 was used and the horn directly contacted the strand to securely attach the tuftstring to the backing, some damage to the strand was observed.) The carpet was bulked in a manner similar to that described in Example 1. It is believed that if this carpet were tested according to the procedure described in the above test methods, Moisture Stability (Test A), it would have an average (over 5 samples) length % change of 2% or less in the MD and XD indicating that this carpet would be moisture stable tuftstring carpet assembly.

It is significant that the strand has a sheath made from a nylon copolymer which has a lower melting point than the polymer of the nylon 6,6 multifilament face yarn. When this lower melting point sheath polymer is used, the ultrasonic energy is applied directly by the horn to the nylon 6,6 multifilament face yarn. If the sheath copolymer has a lower melting point than the filaments of the face yarn, the chance of filament damage in the face yarn is reduced since the lower melting point sheath polymer may tend to melt before the higher melting point filaments. In contrast, when the ultrasonic energy is applied directly to the nylon 6,6 multifilament face yarn to fuse the filaments to a sheath/core strand or monofilament strand, wherein the sheath polymer or monofilament polymer has the same melting point temperature as the nylon 6,6 multifilament face yarn, there is a possibility that some of the filaments in the face yarn may be damaged. Similarly the nylon staple yarn sheath of the support strand in Example 6 also has a lower melt point than the nylon 6,6 face yarn.

Example 8

Figure 13:
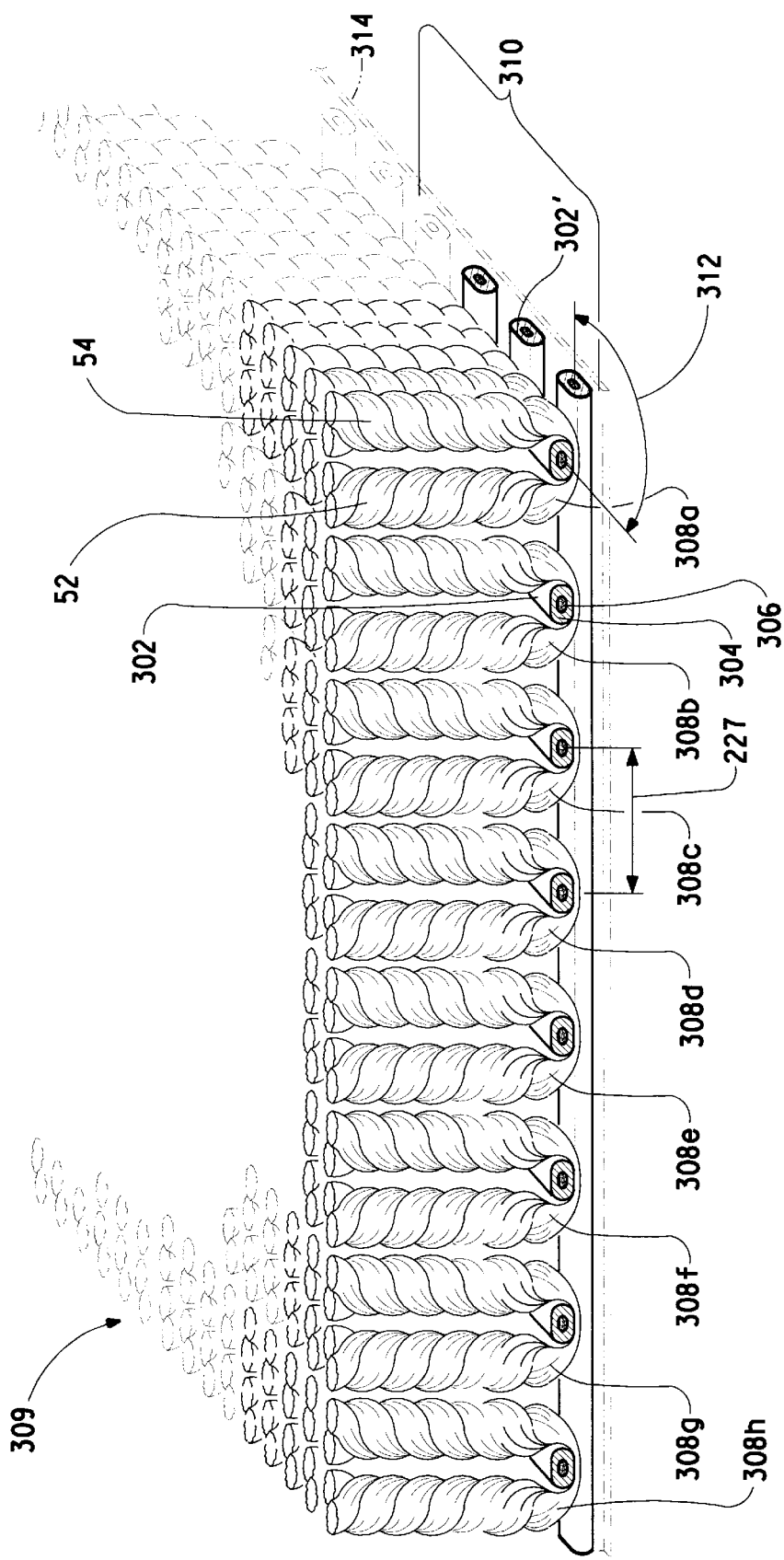
FIG. 13 is a diagrammatic end view, similar to FIG. 5, of a portion of a pile surface structure.

Nylon Tuftstring Carpet Made With The Strand Of Example 6 And With A Backing Made With The Strand Of Example 6 In The Cross-Tuftstring Direction A nylon tuftstring carpet sample 309 shown in FIG. 13 (which is similar to the carpet of FIG. 5) was made having a face yarn of solution dyed nylon 6,6 similar to Example 1, but a bisquit color, and fusion bonded to a sheath/core strand 302 having a staple yarn sheath 304 of nylon 6,6 containing 30% by weight of units derived from MPMD (2-methylpentamethylene diamine) and a core 306 of glass filaments as described in Example 6 to form a tuftstring such as 308a. A parallel array 310 of these wrapped staple yarn sheath/core strands such as 302', as described in Example 6, were formed at a density of about 5 strands per inch, and the tuftstrings 308a–308h were fusion bonded perpendicular to the strands in the array as shown at angle 312 using ultrasonic energy. The nylon 6,6 face yarn was placed on the tuftstring strand at a density of 12 tufts pairs, such as tufts 52 and 54 per inch and cut to form a 0.5 inch pile height. The tuftstrings were fusion bonded using ultrasonic energy to the backing at a spacing 227 to achieve a density of 5 strands per inch to provide a carpet with a yarn face weight of about 25 oz/sq yd. The tuftstrings, such as 308a and carpet 309 were formed using the device described in FIG. 3. The parallel array 310 was formed on the cylinder 210 by placing pins around the periphery of the ends of the cylinder and winding the strand 302 back and forth between the pins on one end and the other. The carpet was cut off the cylinder and removed from the pins, and bulked in a manner similar to that described in Example 1. It is believed that if this carpet were tested according to the procedure described in the above test methods, Moisture Stability (Test A), it would have an average (over 5 samples) length % change of 2% or less in the MD and XD indicating that this carpet would be a moisture stable tuftstring carpet assembly.

An alternate way to form the parallel array 310 of strands making up the backing is to separately form the array on a device similar to that described in U.S. Pat. No. 3,728,195 (the disclosure of which is hereby incorporated herein by reference) and weave in a plurality of polyester retaining yarns arranged perpendicular to the array of strands to form a leno weave backing web where the strands, such as 302' are held in the spaced parallel array 310 after they are removed from the machine. This backing web may then be placed on the cylinder 210 and the tuftstrings fusion bonded to the web. An alternate strand to use replacing strand 302 in the Example 8 tuftstring carpet structure described above is to use the sheath/core strand described in Examples 1, or 5, or 7. These may be preferred for particular applications, but it is believed that using the strand of Example 6, as described above, is most preferred for making a low cost tuftstring carpet structure.

The carpet structure of Example 8, as described above, has an open structure not found on conventional carpets that have had latex adhesive applied, or woven type carpets. It is also a more open structure than a porous structure having a backing of the type described in Example 1. This open structure may be advantageous for reducing the time required to heat the face yarn when treating the carpet in the bulking step, or for reducing the time to dry the carpet if it has been dyed.

Example 9

The Carpet Structure Of Example 8 With A Backing Substrate That Has An Additional Fabric Support Layer Of Polyester The tuftstring carpet assembly 309 of Example 8 is first prepared (FIG. 13). Before the parallel array 310 of strand such as 302' is placed on cylinder 210 (FIG. 13), a 1.05 oz/sq yd spunbonded polyester fabric 314 (shown in dashed lines), "Reemay", available from DuPont (Wilmington, Del.) is placed on the cylinder and then the array 310 is placed on top of the fabric 34. The tuftstring 308a is then fusion bonded to both the strand array 310 and the fabric 314 by the application of ultrasonic energy to attach the tuftstring. The "Reemay" fabric provides some protection to the back side of the carpet structure and is believed to add some structural strength that may be desireable to resist handling, installation, and wear forces on the carpet. The carpet was bulked in a manner similar to that described in Example 1. It is believed that if this carpet were tested according to the procedure described in the above test methods, Moisture Stability (Test A), it would have an average (over 5 samples) length % change of 2% or less in the MD and XD. The actual average length % change based on only one (1) tested sample was 0.28% MD and 0.28% XD indicating that this carpet structure would be a moisture stable tuftstring carpet assembly.

An alternate way to incorporate the "Reemay" fabric layer into the structure is to form the leno weave backing web as described in Example 8 and attach the Reemay fabric to the web using an acrylic adhesive applied to the web. It is believed a modified acrylic adhesive, such as a methyl methacrylate and ethyl acrylate cross-linked composition, would work well. This would also have the advantage that the resulting web/fabric structure would be a robust structure that could be handled like conventional carpet backings. This provides for the possibility of different assembly procedures for the carpet, such as using the procedures described in the co-pending patent application Ser. No. 08/513,734 filed Aug. 10, 1995.

An alternate material to use for an additional fabric support layer 314 is to use a 2 oz/sq yd nonwoven, non-bonded polyester, "Sontara", and to process it the same way as the "Reemay" fabric layer. Another alternate support layer is a 1–3 oz/sq yd spunbonded sheet made with bicomponent filaments of a polyester core and nylon 6 sheath, "Colback", manufactured by AKZO Nobel Nonwovens Inc., a division of BASF Corp. Other support layers are possible depending on special features or functionalities for the finished carpet structure, as long as these layers do not compromise the moisture stability of the finished carpet structure. These support layers may be dyed to match the face yarns or may have special identifying marks (brand names, cleaning instructions, or the like) printed on the outward facing surface.

Example 10

Carpet Similar To Example 7 Made With The Addition Of An Adhesive Film Between The Tuftstring And Backing Substrate A tuftstring carpet assembly was made having solution dyed nylon 6,6 face yarn similar to Example 1, but a bisquit color, and fusion bonded to a sheath/core strand with a sheath of nylon 6,6/6 copolymer having 85% by weight nylon 6,6 and 15% by weight nylon 6 to form a tuftstring. This resultant nylon copolymer sheath would be expected to have a melting point temperature about 20 degrees C. below the melting point temperature of the nylon 6,6 face yarn. A continuous film composed of a modified polyethylene, "Bynel" available from DuPont Co. and designated CXA 41E557, was placed between the tuftstring and backing. The tuftstring was fusion bonded to the film and the film to the backing substrate of nylon 6,6 "Sontara" and glass fiber laminate in a single step using ultrasonic energy. The backing substrate was the same as that described in Example 1. The sheath/core support strand had a total denier of 3200, a glass denier of 900 and a glass-to-nylon ratio of 0.20 and an oval cross-section. It is believed that if this sheath/core support strand were tested by itself according to methods described in U.S. Pat. No. 5,470,656, it would be moisture stable. The continuous film of "Bynel" CXA 41E557 was made from a resin comprising a base polymer of low density polyethylene blended with a high density polyethylene grafted with maleic anhydride, where the maleic anhydride content of the resin was 0.12%. The base polymer comprised about 90% of the resin-blend resulting in a resin density of 0.916 g/cc. The resin blend had a melt temperature of about 127° C. The continuous film was made by placing pellets of "Bynel" CXA 41E557 having a melt index of about 3.0 in an extruder and extruding through a slot die onto a chilled roll to form a 3 mil thick film, and winding the cooled film off the roll. The resin's low melt index of less than 30 and preferably less than 10 provides a high viscosity to the resin. This resin provides a film that can be wound into a roll without sticking to itself and requiring release paper. The resulting film on the backing will not blow out of place during the carpet bulking step. It is also important that the resin and resulting film have a melt temperature greater than 100° C. so the finished carpet can be steam cleaned without weakening or delaminating of the carpet's structure.

The nylon 6,6 face yarn was placed on the strand at a density of 12 tufts pairs per inch and cut to form a 0.5 inch pile height. The tuftstrings were fusion bonded using ultrasonic energy to the backing at a density of 5 strands per inch to provide a carpet with a yarn face weight of about 25 oz/sq yd. The tuftstrings and carpet were formed using the device described in FIG. 3. The carpet was cut into small samples (14"×14") and bulked in a laboratory convection oven with a weight (to hold the samples flat) applied in a manner similar to that described for curing the epoxy adhesive in Example 4 except the temperatures were kept at about 150 degrees C. (It is believed that samples bulked in the manner of Example 1 would also work.) The bulking temperatures caused the film to adhere uniformly to the adjacent "Sontara" layer of the backing, but surprisingly without impregnation of the "Sontara". The addition of the film to the carpet structure was found to improve adhesion between the tuftstring and the backing, and without the need for an increase in the ultrasonic energy applied, which at some point may damage the face yarn filaments. It is believed that if this carpet were tested according to the procedure described in the above test methods, Moisture Stability (Test A), it would have an average (over 5 samples) length % change of 2% or less in the MD and XD. The actual average length % change based on only 2 tested samples was 0.33% MD and 0% XD indicating that this carpet would be a moisture stable tuftstring carpet assembly.

Preferably, the melt index of the "Bynel" resin is in the range of at about 1.0 to 9.0 depending on the desired melt point and viscosity of the resin in order to accommodate different fabrication techniques. For instance, the 1.0 resin has a higher viscosity than the 3.0 resin of this Example 10. The 3.0 resin may be suitable for forming a film by melt blowing. The 9.0 resin has a lower viscosity and may be suitable for extrusion coating a film directly onto the backing substrate. The "Bynel" film preferably has a thickness in the range of about 3 to 5 mils. It was found that a 2 mil film did not provide good adhesion. A 5 mil film did not significantly improve the adhesion, and the 5 mil film was more expensive than the 3 mil film.

TABLE II

MOISTURE STABILITY (TEST A)
EXAMPLE 1: NYLON TUFTSTRING CARPETS

| Sample # | Length (cm) in T/SD after 168 Hours in Wet Condition | Length (cm) in XD after 168 Hours in Wet Condition | Length (cm) in T/SD after 72 Hours in Dry Condition ($\leq$3% RH) | Length (cm) in XD after 72 Hours in Dry Condition ($\leq$3% RH) | Length % Change T/SD* | Length % Change XD* |
|---|---|---|---|---|---|---|
| 1 | 35.10 | 35.10 | 34.90 | 34.90 | 0.57% | 0.57% |
| 2 | 35.10 | 35.10 | 34.90 | 34.90 | 0.57% | 0.57% |
| 3 | 35.10 | 35.10 | 34.85 | 35.00 | 0.71% | 0.28% |
| 4 | 35.10 | 35.10 | 34.95 | 35.00 | 0.43% | 0.28% |
| 5 | 35.10 | 35.05 | 34.80 | 34.90 | 0.85% | 0.43% |
| 6 | 35.10 | 35.10 | 34.90 | 35.00 | 0.57% | 0.28% |
|   |   |   |   | AVG % chg | 0.62% | 0.40% |

*% chg = (wet-dry)/wet

TABLE III

MOISTURE STABILITY (TEST B)
EXAMPLE 2: POLYPROPYLENE TUFTSTRING CARPETS

| Sample | Length (cm) in T/SD after 72 Hours in Wet Condition | Length (cm) in XD after 72 Hours in Wet Condition | Length (cm) in T/SD after 72 Hours in Dry Condition (14% RH) | Length (cm) in XD after 72 Hours in Dry Condition (14% RH) | Length (cm) in T/SD after 24 Hours in Dry Condition ($\leq$3% RH) | Length (cm) in XD after 24 Hours in Dry Condition ($\leq$3% RH) | Length % Change T/SD* | Length % Change XD* |
|---|---|---|---|---|---|---|---|---|
| 1 | 35 | 35 | 35 | 35 | 35 | 35 | 0% | 0% |
| 2 | 35 | 35 | 35 | 35 | 35 | 35 | 0% | 0% |
| 3 | 35 | 35 | 35 | 35 | 35 | 35 | 0% | 0% |
| 4 | 35 | 35 | 35 | 35 | 35 | 35 | 0% | 0% |
| 5 | 35 | 35 | 35 | 35 | 35 | 35 | 0% | 0% |
|   |   |   |   |   |   | Avg % chg | 0% | 0% |

*% chg = (Wet-Dry)/Wet

TABLE IV

MOISTURE STABILITY (TEST A)
EXAMPLE 3: POLYESTER TUFTSTRING CARPETS

| Sample | Length (cm) in T/SD after 48 Hours in Wet Condition | Length (cm) in XD after 48 Hours in Wet Condition | Length (cm) in T/SD after 24 Hours in Dry Condition ($\leq$3% RH) | Length (cm) in XD after 24 Hours in Dry Condition ($\leq$3% RH) | Length % Change T/SD* | Length % Change XD* |
|---|---|---|---|---|---|---|
| 1 | 34.9 | 35.0 | 34.9 | 35.0 | 0% | 0% |
| 2 | 35.1 | 35.1 | 35.1 | 35.1 | 0% | 0% |
| 3 | 35.0 | 35.0 | 35.0 | 35.0 | 0% | 0% |
| 4 | 35.0 | 35.0 | 35.0 | 35.0 | 0% | 0% |

TABLE IV-continued

MOISTURE STABILITY (TEST A)
EXAMPLE 3: POLYESTER TUFTSTRING CARPETS

| Sample | Length (cm) in T/SD after 48 Hours in Wet Condition | Length (cm) in XD after 48 Hours in Wet Condition | Length (cm) in T/SD after 24 Hours in Dry Condition (≦3% RH) | Length (cm) in XD after 24 Hours in Dry Condition (≦3% RH) | Length % Change T/SD* | Length % Change XD* |
|---|---|---|---|---|---|---|
| 5 | 35.0 | 30.0* | 35.0 | 30.0 | 0% | 0% |
|  |  |  |  | Avg % chg | 0% | 0% |

*Width of this sample marked for 30 cm
*% chg = (wet-dry)/wet

TABLE V

MOISTURE STABILITY (TEST A)
EXAMPLE 4: NYLON TUFTSTRING CARPETS WITH SEPARATE BONDING ADHESIVE

| Sample | Length (cm) in T/SD after 48 Hours in Wet Condition | Length (cm) in XD after 48 Hours in Wet Condition | Length (cm) in T/SD after 24 Hours in Dry Condition (≦3% RH) | Length (cm) in XD after 24 Hours in Dry Condition (≦3% RH) | Length % Change T/SD* | Length % Change XD |
|---|---|---|---|---|---|---|
| 1 | 30.3 | 30.2 | 30.0 | 30.0 | 0.99% | 0.66% |
| 2 | 30.0 | 30.1 | 29.9 | 29.9 | 0.33% | 0.66% |
| 3 | 29.0 | 30.0 | 28.9 | 30.0 | 0.35% | 0% |
| 4 | 29.0 | 30.0 | 28.9 | 29.8 | 0.35% | 0.66% |
| 5 | 30.0 | 30.0 | 29.9 | 29.9 | 0.33% | 0.33% |
|  |  |  |  | Avg. % chg. | 0.47% | 0.46% |

*% chg = (wet-dry)/wet

We claim:

1. A pile surface structure comprising:

a) a moisture stable backing substrate which is moisture stable in the machine direction (MD) and cross-machine direction (XD); and b) a plurality of elongated pile articles each comprising an elongated, moisture stable support strand comprising a core of continuous glass filaments and at least one multifilament yarn at least partially wrapped around said core, wherein a plurality of "U" shaped bundles of multifilament yarn are bonded to the strand, each bundle defining a pair of upstanding tufts extending from the strand;

the elongated pile articles placed one next to the other and bonded to the backing substrate with the tufts extending away from the backing, whereby the pile surface structure is a moisture stable tuftstring carpet assembly.

2. The pile surface structure of claim 1, wherein the multifilament yarn at least partially wrapped around said core is either a staple yarn or a bulked continuous filament yarn.

3. The pile surface structure of claim 2, wherein the multifilament yarn at least partially wrapped around said core is a nylon staple yarn.

4. The pile surface structure of claim 3, wherein the multifilament yarn at least partially wrapped around said core is a nylon staple yarn comprising a blend of nylon and polypropylene filaments.

5. The pile surface structure of claim 3, wherein the multifilament yarn at least partially wrapped around said core is a nylon staple yarn comprising a nylon 6,6 copolymer containing units derived from 2-methyl-pentamethylenediamine.

6. The pile surface structure of claim 3, wherein the moisture stable backing substrate comprises a first layer of a nonwoven fabric of entangled, non-bonded nylon filaments, a second layer of fiberglass scrim, and a third layer of a nonwoven fabric of entangled, non-bonded nylon filaments, wherein each layer of nonwoven fabric is adhesively bonded to the layer of fiberglass scrim at contact points along the fabrics and scrim.

7. The pile surface structure of claim 6, wherein the nylon comprising the filaments of the first and third layers is a nylon 6,6 copolymer containing units derived from 2-methyl-pentamethylene diamine.

8. The pile surface structure of claim 2, wherein the "U" shaped bundles of multifilament yarn are nylon and the backing substrate includes on the side bonded to the pile articles a coating of polyethylene film having a melting point of greater than 100° C. and less than the melting point of the multifilament nylon yarn; and wherein the elongated pile articles are bonded to the coated surface of the backing substrate.

9. The pile surface structure of claim 8, wherein the polyethylene film comprises a blend of a polyethylene polymer and a polyethylene copolymer grafted with maleic anhydride.

10. The pile surface structure of claim 9, wherein the polyethylene film has a melting point of greater than 100° C. and a melt index in the range of 0.5 to 30 dg/min. at 190° C.

11. The pile surface structure of claim 8, wherein the polyethylene film has a thickness in the range of about 3 mil to 5 mil.

12. The pile surface structure of claim 8, wherein the elongated pile articles are ultrasonically bonded to the backing substrate and the pile surface structure has been heated to a temperature in the range of about 125° C. to 180° C.

13. The pile surface structure of claim 2,
wherein the yarn wrapped around the core has a melting point which is lower than the melting point of the "U" shaped bundles of multifilament yarn.

14. The pile surface structure of claim 13, wherein the moisture stable backing substrate has a melting point which is lower than the melting point of the "U" shaped bundles of multifilament yarn.

15. A pile surface structure comprising:
   a) a backing substrate comprising a non-intersecting array of moisture stable strands spaced apart at a density of 10 strands/inch or less, each moisture stable strand comprising a core of continuous glass filaments and at least one multifilament yarn at least partially wrapped around said core; and
   b) a plurality of elongated pile articles each comprising an elongated, moisture stable support strand having bonded thereto a plurality of "U" shaped bundles of multifilament yarn, each bundle defining a pair of upstanding tufts extending from the strand;
   the elongated pile articles placed one next to the other and bonded to the backing substrate with the tufts extending away from the backing and the moisture stable strands of the backing substrate oriented in a cross direction from 45 to 90 degrees to the elongated pile articles, whereby the pile surface structure is a moisture stable tuftstring carpet assembly.

16. The pile surface structure of claim 15 wherein said at least one multifilament yarn at least partially wrapped around said core is formed from nylon.

17. The pile surface structure of claim 15, wherein each moisture stable strand of the elongated pile articles comprises a core of continuous glass filaments and at least one multifilament yarn at least partially wrapped around said core.

18. The pile surface structure of claim 15, wherein each moisture stable strand of the backing further comprises a nylon sheath surrounding the core.

19. The pile surface structure of claim 15, wherein the array of non-intersecting moisture stable strands comprising the backing substrate are attached to a backing support fabric.

20. The pile surface structure of claim 19, wherein the backing support fabric is a spunbonded polyester fabric.

21. The pile surface structure of claim 19, wherein the backing support fabric is a non-bonded non-woven polyester fabric.

22. The pile surface structure of claim 19, wherein the backing support fabric is a spunbonded fabric comprising bicomponent filaments of a polyester core and a nylon sheath.

\* \* \* \* \*